United States Patent
Abo et al.

(10) Patent No.: US 10,328,890 B2
(45) Date of Patent: Jun. 25, 2019

(54) COMPLETELY FOLDED BODY OF AIRBAG AND FOLDING METHOD OF THE SAME

(71) Applicant: TOYODA GOSEI CO., LTD., Kiyosu-shi, Aichi-ken (JP)

(72) Inventors: Hayato Abo, Kiyosu (JP); Hitoshi Iida, Kiyosu (JP); Ryotaro Ishida, Kiyosu (JP); Yoshiteru Banno, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 37 days.

(21) Appl. No.: 15/440,366

(22) Filed: Feb. 23, 2017

(65) Prior Publication Data
US 2017/0274860 A1  Sep. 28, 2017

(30) Foreign Application Priority Data
Mar. 28, 2016 (JP) .................................. 2016-064607

(51) Int. Cl.
*B60R 21/237* (2006.01)
*B60R 21/203* (2006.01)

(52) U.S. Cl.
CPC .......... *B60R 21/237* (2013.01); *B60R 21/203* (2013.01)

(58) Field of Classification Search
CPC .............. B60R 21/203; B60R 21/2032; B60R 21/2035; B60R 21/2037; B60R 21/237
See application file for complete search history.

(56) References Cited

U.S. PATENT DOCUMENTS

| 5,605,350 A | * | 2/1997 | Bates | B60R 21/203 280/731 |
| 5,865,466 A | * | 2/1999 | Yamamoto | B60R 21/201 280/743.1 |

(Continued)

FOREIGN PATENT DOCUMENTS

| JP | 2000-109268 A | 4/2000 |
| JP | 2006-103667 A | 4/2006 |
| JP | 2012-006598 A | 1/2012 |

OTHER PUBLICATIONS

Machine translation of JP 2012-6598 equivalent (Year: 2018).*

(Continued)

*Primary Examiner* — Barry Gooden, Jr.
(74) *Attorney, Agent, or Firm* — Posz Law Group, PLC

(57) ABSTRACT

A completely folded body of an airbag includes: a front-side folded portion; and a rear-side folded portion, wherein: the front-side folded portion has such a folded shape that a tip separated longitudinally from the mounting portion of the front overlapped portion is stored in a dent portion, in which a front side is open and a rear side is dented, between a mounting-portion-side folded portion near the mounting portion and a central folded portion between the tip and the mounting-portion-side folded portion; the tip of the front overlapped portion includes a leading edge separate longitudinally the farthest from the mounting portion, and a tip root-side portion connected to the leading edge; and the leading edge is provided on an upper side of the tip root-side portion in the front-side folded portion to be inverted rearward to a central side of the mounting portion.

1 Claim, 23 Drawing Sheets

(56) References Cited

U.S. PATENT DOCUMENTS

| | | | |
|---|---|---|---|
| 6,176,509 B1 * | 1/2001 | Kawaguchi | B60R 21/237 280/728.1 |
| 6,206,409 B1 * | 3/2001 | Kato | B60R 21/201 280/728.2 |
| 6,264,237 B1 * | 7/2001 | Terada | B60R 21/237 280/743.1 |
| 6,286,866 B1 * | 9/2001 | Satge | B60R 21/237 280/743.1 |
| 6,471,238 B2 * | 10/2002 | Ishikawa | B60R 21/21656 280/728.3 |
| 6,962,366 B2 * | 11/2005 | Fukuda | B60R 21/201 280/743.1 |
| 7,314,228 B2 * | 1/2008 | Ishiguro | B60R 21/201 280/728.1 |
| 7,445,239 B2 * | 11/2008 | Okada | B60R 21/237 280/743.1 |
| 2006/0012157 A1 * | 1/2006 | Ishiguro | B60R 21/201 280/731 |
| 2006/0055156 A1 | 3/2006 | Okada et al. | |
| 2006/0113774 A1 * | 6/2006 | Hirose | B60R 21/233 280/731 |
| 2006/0113776 A1 * | 6/2006 | Iida | B60R 21/233 280/731 |
| 2008/0277907 A1 * | 11/2008 | Sato | B60R 21/201 280/730.2 |
| 2009/0218799 A1 * | 9/2009 | Taniyama | B60R 21/201 280/743.2 |
| 2010/0289253 A1 * | 11/2010 | Washino | B60R 21/201 280/728.3 |

OTHER PUBLICATIONS

Office Action dated Feb. 26, 2019 issued in corresponding JP patent application No. 2016-064607 (and English machine translation).

* cited by examiner

REAR ⟵          ⟶ FRONT

A.

B.

97  44

C.

77A
88A  78

D.

77A

COMPLETELY FOLDED BODY OF AIRBAG AND FOLDING METHOD OF THE SAME

CROSS-REFERENCE TO RELATED APPLICATION(S)

This application is based upon and claims the benefit of priority from Japanese Patent Application No. 2016-064607, filed on Mar. 28, 2016, the entire contents of which are incorporated herein by reference.

BACKGROUND

1. Field of the Invention

The present invention relates to a completely folded body obtained by folding an airbag stored in a steering wheel steered by a driver in a storage shape, and a folding method thereof.

2. Description of the Related Art

In the related art, an airbag stored in a steering wheel is known which is inflated while suppressing the float from longitudinal portions of a ring portion, which is steered by a driver, of the steering wheel in the middle of inflation (for example, see JP-A-2012-6598). In such an airbag, before the airbag is completely inflated, a swinging movement of repeating the contact/separation of the ring portion can be suppressed, and a counterforce from the ring portion can be quickly secured when the inflation of the airbag is completed.

The airbag includes an outer bag forming an outer circumferential wall, and an inner bag provided inside the outer bag. The outer bag is formed by coupling the outer circumferential peripheries of a driver-side wall and a vehicle-side wall on the ring portion side which have substantially circular shape to each other. The vehicle-side wall is provided, in the center, with an inflow opening, which is open to admit an inflation gas to flow inside, and a mounting portion which is disposed in the circumferential periphery of the inflow opening and is used to mount the airbag in a boss portion of the steering wheel. The inner bag includes a central portion which covers the inflow opening of the outer bag, and a front-side arm and a rear-side arm which extend in a tapered shape from the central portion to both front and rear sides. When the inflation gas flows into airbag, the inner bag is inflated prior to the outer bag to press the inner circumferential surface of the outer bag on both tip sides of the front-side arm and the rear-side arm first. Therefore, the swinging movement of repeating the contact/separation of the ring portion can be suppressed before the airbag is completely inflated.

In the conventional completely folded body of an airbag, a front-side folded portion and a rear-side folded portion are disposed on front and rear sides of the upper side of the mounting portion. In the front-side folded portion and the rear-side folded portion, in a state where the inner bag is placed inside, the driver-side wall and the vehicle-side wall of the outer bag are flatly deployed in the overlapped state. A horizontally-shortening folding is performed in a bellows manner and the like such that right and left peripheries are brought to the upper side of the mounting portion and the horizontal width dimension corresponds to the horizontal width dimension of the storage portion. Both front and rear sides are folded to the upper side of the mounting portion in such a manner that front and rear tips are folded to the mounting portion side in the respective central positions of the front end side and the rear end side from the mounting portion, and the tip sides of the folded crease are folded to the mounting portion side, that is, two foldings are performed twice. For this reason, the front-side folded portion and the rear-side folded portion are obtained by folding the front overlapped portion and the rear overlapped portion of the front side and the rear side of the mounting portion in a state where the driver-side wall and the vehicle-side wall of the outer bag are flatly deployed.

The conventional airbag is covered with the airbag cover having a front door and a rear door which are open to both front and rear sides when the breakage expected portion is broken, and stored. Thus, front and rear hinges of the front door and the rear door suppress that both front and rear ends of the airbag protrudes from the storage portion, that is, suppress that respective tips of the front end side and the rear end side of the airbag protrude in the initial inflation. In a subsequent inflation process, it is easily suppressed that the front end side and the rear end side of the airbag float from the front and rear portion of the ring portion.

However, when the completely folded body of the airbag is covered with the airbag cover having the doors which are open to both front and rear sides, the hinges thereof are positioned on the left and right sides, and the front end side and the rear end side of the airbag are disposed in the front and rear sides of portions on the tip side which are largely open in the left and right doors at the initial inflation. For this reason, at the initial inflation, the front end side and the rear end side of the airbag largely protrude from the storage portion, and largely float from the upper surface of the front and rear portion of the ring portion. Thus, it is hard to exert an effect to suppress the swinging before the airbag is completely inflated.

As a countermeasure, it is considered that the front-side folded portion and the rear-side folded portion of the completely folded body of the airbag are roll-folded to be wound from the tip side on the vehicle-side wall side so that the protrusion at the initial inflation can be suppressed by suppressing the release of the folding when the inflation gas flows inside. However, in this case, there is a risk that when the folding is released with the flow of the inflation gas, at least front-side folded portion goes to the lower surface side of the ring portion through the opening provided inside the front portion of the ring portion provided for securing the visibility of meters on the front side of the steering wheel. If front-side folded portion goes to the lower surface side of the ring portion, it results in a situation where the inflated portion of the front-side folded portion cannot be disposed on the upper surface of the ring portion.

SUMMARY

The present invention is made to solve the above-described problem, and an object thereof is to provide a completely folded body of an airbag which can prevent that an inflated portion of a front-side folded portion goes to a lower surface side of a ring portion or protrudes to be separated largely from an upper side of the ring portion at an initial inflation and a folding method thereof.

According to an aspect of the present invention, there is provided a completely folded body of an airbag which is stored in a boss portion of a steering wheel and is completely inflated to be supported by an upper surface of a ring portion of the steering wheel steered by a driver, the completely folded body including: a front-side folded portion; and a rear-side folded portion, wherein: the airbag is formed by coupling outer circumferential peripheries of a driver-side wall and a vehicle-side wall supported by the ring portion which have substantially circular shape to each other; the vehicle-side wall is provided, in a center, with an inflow opening which is open to admit an inflation gas to flow inside, and a mounting portion which is disposed in a circumferential periphery of the inflow opening and is used to mount the airbag in the boss portion; the front-side folded portion and the rear-side folded portion are disposed on front and rear sides of an upper side of the mounting portion; the front-side folded portion and the rear-side folded portion are formed respectively by a front overlapped portion and a rear overlapped portion which are centered on the mounting portion in a state where the driver-side wall and the vehicle-side wall are overlapped to be flatly deployed; at least the front-side folded portion of the front-side folded portion and the rear-side folded portion has such a folded shape that a tip separated longitudinally from the mounting portion of the front overlapped portion is stored in a dent portion, in which a front side is open and a rear side is dented, between a mounting-portion-side folded portion near the mounting portion and a central folded portion between the tip and the mounting-portion-side folded portion; the tip of the front overlapped portion includes a leading edge separate longitudinally the farthest from the mounting portion, and a tip root-side portion connected to the leading edge; and the leading edge is provided on an upper side of the tip root-side portion in the front-side folded portion to be inverted rearward to a central side of the mounting portion.

In the completely folded body according to the present invention, when the inflation gas flows inside through the inflow opening, prior to the tip of the front overlapped portion in the front-side folded portion, the mounting-portion-side folded portion close to the mounting portion of the front overlapped portion begins to be inflated first, and then the central folded portion between the tip and the mounting-portion-side folded portion is inflated. Since the mounting-portion-side folded portion is inflated, the tip is pushed forward and upward from the opening of the dent portion. However, since the central folded portion is inflated subsequently to the inflation of the mounting-portion-side folded portion, it is suppressed that the tip protrudes to the upper side. Thereafter, the mounting-portion-side folded portion and the central folded portion are further inflated so that the dent of the dent portion is released, and the tip is pushed to the upper side of the ring portion. At that time, since the leading edge of the tip is pressed by the central folded portion inflating on the upper side, the leading edge is brought close to the front portion of the ring portion in the state of being inverted on the upper surface side of the tip root-side portion to be directed rearward. When the mounting-portion-side folded portion and the central folded portion are further inflated, and the tip is inflated, the leading edge rises forward from the upper surface of the tip root-side portion in a position where the upper surface of the front portion of the ring portion is disposed, or a position where the vicinity of the inner side of the front portion of the ring portion is disposed. The leading edge is inflated to extend forward from the tip root-side portion while the inverted folding is released.

The folding of the leading edge is released to place the leading edge on the upper surface side of the front portion of the ring portion. Thus, the tip of the front overlapped portion does not go to the lower surface side of the front portion of the ring portion, and is not separated largely from the upper surface of the front portion of the ring portion while the tip is brought close to the upper surface side of the front portion of the ring portion to be deployed. Further, the tip is inflated such that the thickness increases. Thus, it can be suppressed that the airbag floats from the front portion of the ring portion in the middle of inflation. For this reason, a swinging movement of repeating the contact/separation of the ring portion can be suppressed before the airbag is completely inflated, and thus a counterforce from the ring portion can be quickly secured when the inflation of the airbag is completed.

Therefore, in the completely folded body of the airbag of the present invention, it can be prevented that the inflating portion of the front-side folded portion goes to the lower surface side of the ring portion, or protrudes to be largely separated from the upper side of the ring portion at the initial inflation.

In the completely folded body of the present invention, a longitudinally sectional shape in a horizontal center of the mounting portion of the completely folded body may be formed such that the rear-side folded portion is axisymmetric to the front-side folded portion with a vertical line in a longitudinal center of the mounting portion as a central reference line.

With such a configuration, at the initial inflation, similarly to the front-side folded portion, it can be prevented that the inflated portion of the rear-side folded portion goes to the lower surface side of the ring portion, or protrudes to be separated largely to the upper side of the ring portion. For this reason, although the completely folded body is mounted in the boss portion of the steering wheel with four spokes which has an opening inside the rear portion of the ring portion or the steering wheel with two spokes, the rear-side folded portion does not go into the opening on the rear portion side at the time of inflation, and it can be suppressed that the rear-side folded portion protrudes to be largely separated to the upper side of the ring portion. In the entire airbag, the swinging movement of repeating the contact/separation of the ring portion can be suppressed before the inflation of the airbag is completed, and the counterforce from the ring portion can be quickly secured when the inflation of the airbag is completed.

As described above, at the time of the initial inflation of the airbag, the airbag is placed on the upper surface side of the ring portion, and the airbag is deployed to be brought to the upper surface side of the ring portion while not being separated largely from the upper surface of the ring portion, and the state of being inflated to increase thickness is secured. In other words, the float of the airbag from the ring portion in the middle of inflation is suppressed so that the swinging movement of repeating the contact/separation of the ring portion can be suppressed before the inflation of the airbag completed, and the counterforce from the ring portion can be quickly secured when the inflation of the airbag is completed. When paying attention to the above point, at least the rear-side folded portion of the front-side folded portion and the rear-side folded portion may be configured as above so that the behavior can be secured aggressively on the rear portion side of the ring portion.

That is, at least the rear-side folded portion of the front-side folded portion and the rear-side folded portion in the completely folded body of the airbag has such a folded shape that the tip separate longitudinally from the mounting portion of the rear overlapped portion is provided between the mounting-portion-side folded portion near the mounting portion and the central folded portion between the tip and the mounting-portion-side folded portion, and is stored in the dent portion in which the rear side is open and the front side is dented. The tip of the rear overlapped portion includes the leading edge separate longitudinally the farthest from the mounting portion, and the tip root-side portion connected to the leading edge. The leading edge may be configured to be provided on the upper side of the tip root-side portion in the rear-side folded portion to be inverted forward to the central side of the mounting portion.

In the completely folded body of the present invention, the airbag may include an outer bag including the driver-side wall and the vehicle-side wall and an inner bag provided in a circumferential periphery of the inflow opening of the vehicle-side wall in the outer bag. Further, in the completely folded body of the present invention, the inner bag may include a central portion covering the inflow opening, and a front-side arm and a rear-side arm extending from the central portion to both front and rear sides. Further, in the completely folded body of the present invention, a communication opening communicating with the inflow opening may be provided in the central portion, and together with the mounting portion, an inner-bag-side mounting portion mounted in the boss portion may be provided in a circumferential periphery of the communication opening. Further, in the completely folded body of the present invention, the front-side arm and the rear-side arm may have an outflow opening through which the inflation gas flowing inside through the communication opening flows out outside the inner bag in the airbag, and tips may be configured to press downward an inner circumferential surface of the outer bag at inflation of the inner bag.

In the above-configured inner bag, when the inflation gas flows into the outer bag, the central portion admits the inflation gas to flow thereinto through the communication opening so as to be inflated, and the front-side arm and the rear-side arm are also inflated when the inflation gas flows out through the outflow opening into the outer bag. When the inner bag is completely inflated, the front-side arm and the rear-side arm press downward the inner circumferential surface of the outer bag on the respective tip sides. It is smoothly suppressed that the outer bag floats from the ring portion.

For this reason, in the above-described configuration, the inner bag that can suppress that the vicinity of both front and rear ends of the outer bag floats from the ring portion in the middle of inflation of the airbag is provided in the outer bag including the driver-side wall and the vehicle-side wall which configure the outer circumferential wall of the airbag. For this reason, since the front-side arm and the rear-side arm of the inner bag are inflated before the inflation of the airbag is completed, in the front-side folded portion and the rear-side folded portion of the airbag, the swinging movement of repeating the contact/separation of the ring portion at the time of releasing the folding can be suppressed, and the counterforce from the ring portion can be secured further quickly when the inflation of the airbag is completed.

According to another aspect of the present invention, there is provided a folding method of a completely folded body of an airbag which is stored in a boss portion of a steering wheel and is completely inflated to be supported by an upper surface of a ring portion of the steering wheel steered by a driver, the airbag being formed by coupling outer circumferential peripheries of a driver-side wall and a vehicle-side wall supported by the ring portion which have substantially circular shape to each other, the vehicle-side wall being provided, in a center, with an inflow opening which is open to admit an inflation gas to flow inside, and a mounting portion which is disposed in a circumferential periphery of the inflow opening and is used to mount the airbag in the boss portion, the completely folded body being configured such that a front-side folded portion and a rear-side folded portion are disposed on front and rear sides of an upper side of the mounting portion, the front-side folded portion and the rear-side folded portion being formed respectively from a front overlapped portion and a rear overlapped portion which are centered on the mounting portion in a state where the driver-side wall and the vehicle-side wall are overlapped to be flatly deployed, at least the front-side folded portion of the front-side folded portion and the rear-side folded portion having such a folded shape that a tip separated longitudinally from the mounting portion of the front overlapped portion is stored in a dent portion, in which a front side is open and a rear side is dented, between a mounting-portion-side folded portion near the mounting portion and a central folded portion between the tip and the mounting-portion-side folded portion, the tip of the front overlapped portion including a leading edge separate longitudinally the farthest from the mounting portion, and a tip root-side portion connected to the leading edge, the leading edge being provided on an upper side of the tip root-side portion in the front-side folded portion to be inverted rearward to a central side of the mounting portion, the central folded portion in the front-side folded portion being connected to the tip root-side portion, and includes an upper-side contact portion which contacts with the leading edge at an upper side of the tip and is formed from the front overlapped portion, the method including: nipping both sides of the upper-side contact portion when the mounting-portion-side folded portion, the central folded portion, and the tip are folded from a state of being flatly deployed from the mounting portion in the front-side folded portion; rotating a front periphery of the nipped upper-side contact portion to a vehicle-side wall side to be vertically inverted, and disposing the nipped upper-side contact portion on the front side of the upper side of the mounting portion; and folding the leading edge by attaching a crease between the leading edge and the tip root-side portion and inserting the leading edge to a lower position of the upper-side contact portion.

In the folding method of the embodiment according to the present invention, the front-side folded portion before folding is in a state where an area from the mounting portion to the leading edge of the tip is flatly deployed. From the state, simply, the upper-side contact portion is nipped and rotated to be disposed on the upper and front side of the mounting portion, and the leading edge of the tip is folded to be inverted. Thus, the front-side folded portion can be simply formed in which it can be prevented that the front-side folded portion goes to the lower surface side of the ring portion or protrudes to the upper side of the ring portion to be largely separated at the initial inflation.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
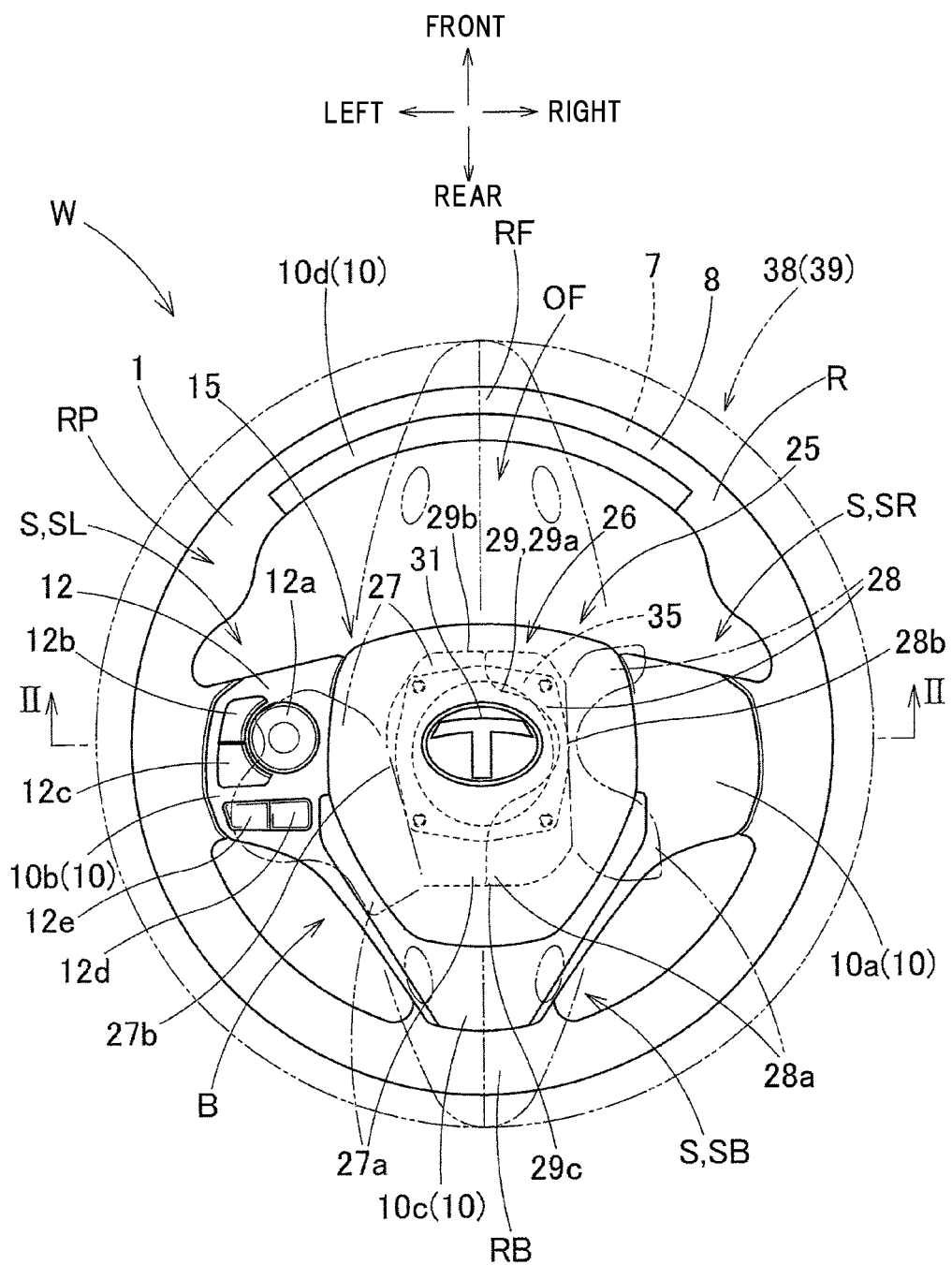
FIG. 1 is a plan view illustrating a steering wheel which stores a completely folded body of an airbag of an embodiment.

Hereinafter, one embodiment of the present invention will be described on the basis of the drawings. As illustrated in FIG. 1, a completely folded body 77 of the embodiment is mounted as an airbag device 15 in a boss portion B in the center of a steering wheel W. The steering wheel W includes a steering wheel body 1 having a ring portion R gripped at the time of steering, the boss portion B disposed in the center of the ring portion R, and a spoke portion S connecting the ring portion R and the boss portion B, and the airbag device 15 provided in the upper portion of the boss portion B.

In this specification, a vertical direction, a horizontal direction, and a longitudinal direction are based on when a vehicle is steered straight ahead in a state where the steering wheel W is connected to a steering shaft SS (see FIG. 2) of the vehicle by fixing with a nut SN. The vertical direction corresponds to a vertical direction along the axial direction of the steering shaft SS (see FIGS. 2 and 15). The horizontal direction corresponds to a horizontal direction of the vehicle which is a direction orthogonal to the steering shaft SS (see FIG. 1). The longitudinal direction corresponds to a longitudinal direction of the vehicle which is a direction orthogonal to the steering shaft SS (see FIGS. 1 and 15).

Figure 2:
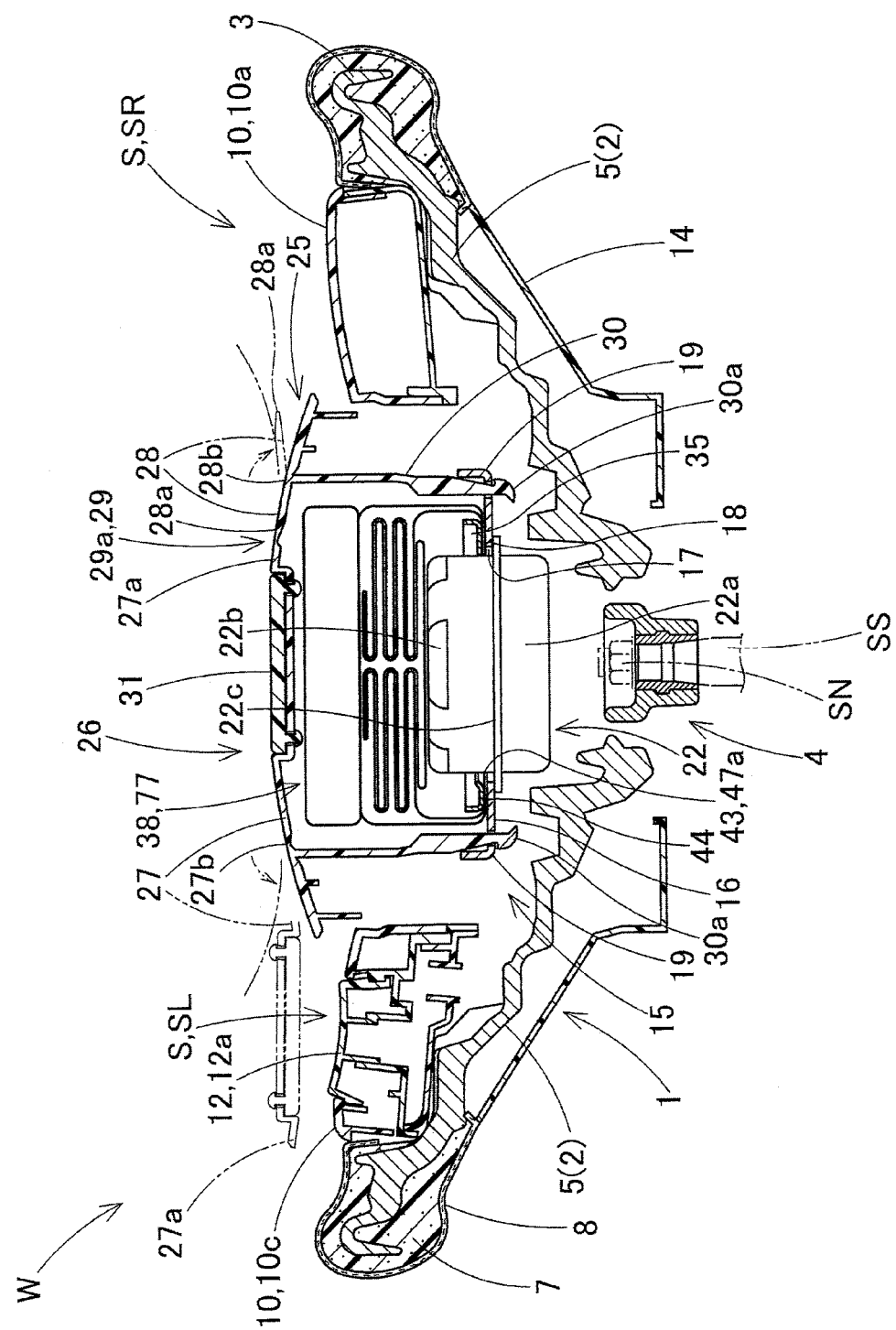
FIG. 2 is a sectional view illustrating the steering wheel which stores the completely folded body of the airbag of the embodiment, and corresponds to a portion taken along line II-II of FIG. 1.
Figure 15:
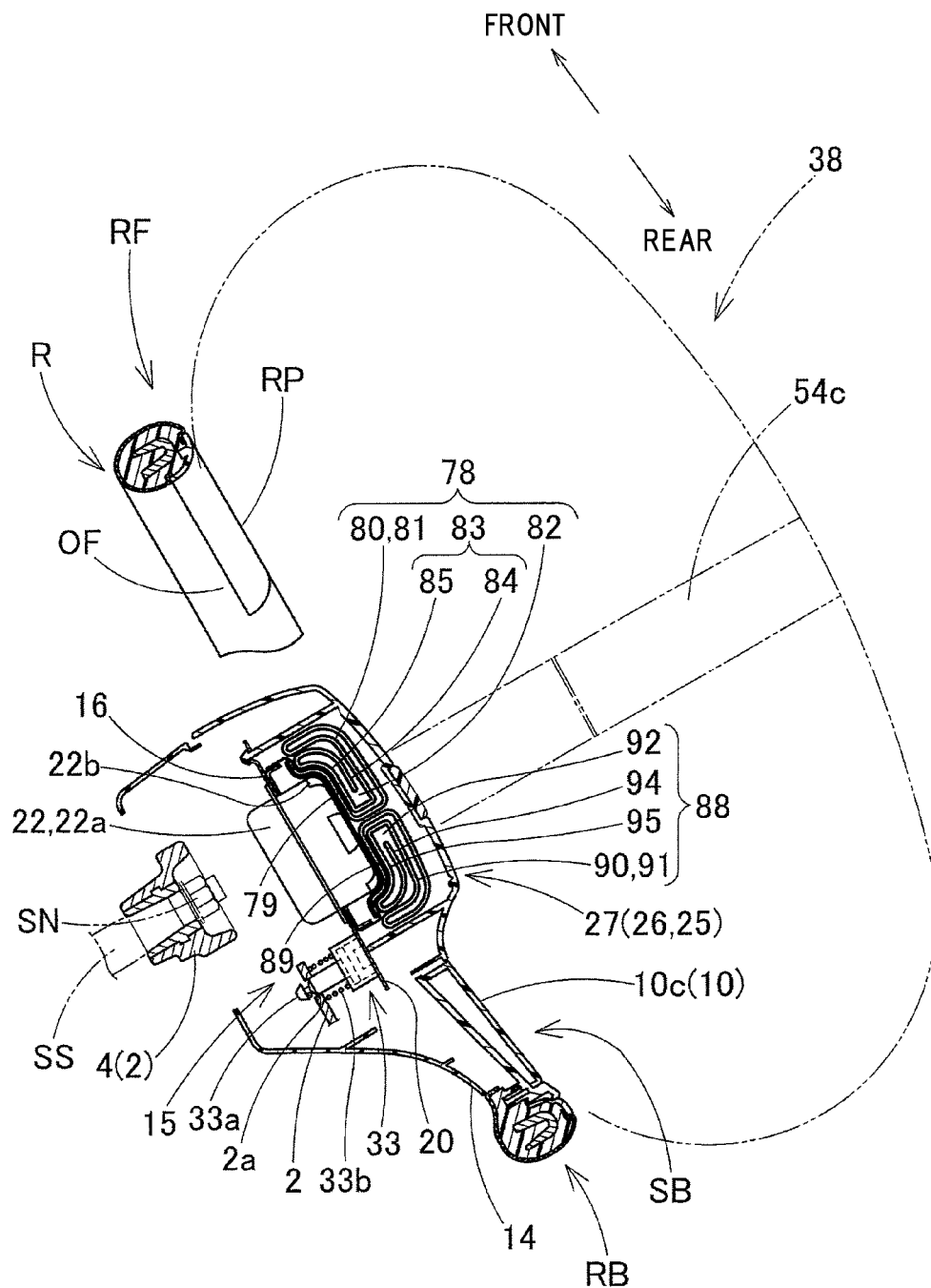
FIG. 15 is a sectional view schematically illustrating a state where an airbag device provided with the completely folded body of the embodiment is mounted in the steering wheel.

As illustrated in FIGS. 1, 2, and 15, the steering wheel body 1 includes a cored bar 2 provided to connect the ring portion R, the boss portion B, and the spoke portion S with each other, and a coating layer 7 which is made of urethane and the like and covers a portion of the cored bar 2 in the ring portion R and the spoke portion S near the ring portion R. A leather 8 is wound around the surface of the coating layer 7. A synthetic-resin decorative bezel 10d is provided in a front portion RF of the ring portion R to cover the leather 8. The spoke portion S includes three of a left-side spoke portion SL and a right-side spoke portion SR which extend from the front periphery of the boss portion B to both left and right sides, and a back spoke portion SB which extends rearward from the boss portion B.

The cored bar 2 includes a ring cored bar 3 disposed in the ring portion R, a boss cored bar 4 provided in the boss portion B to be coupled with the steering shaft SS, and a spoke cored bar 5 provided in the spoke portion S to connect the ring cored bar 3 and the boss cored bar 4.

A plurality of the synthetic-resin decorative bezels 10 (10a, 10b, 10c, and 10d) for decoration are provided in the vicinity of the airbag device 15. An operating button group 12 of predetermined operation switches is provided in the decorative bezel 10c of the left-side spoke portion SL. In the case of the embodiment, the various operating button group 12 includes, specifically, an operating button 12a determining a mode such as AM, FM, CD, and TV of an audio instrument, an operating button 12b for switch, an operating button 12c for rewinding, and operating buttons 12d and 12e for leveling volume.

The decorative bezels 10a, 10b, and 10c are formed of a hard synthetic resin such as a PP or ABS resin with high shape holding capacity. In the case of the embodiment, as illustrated in FIG. 2, the left-side spoke portion SL and the right-side spoke portion SR in the horizontal direction are provided with the spoke cored bar 5. Meanwhile, as illustrated in FIG. 15, the back spoke portion SB is not provided with the spoke cored bar 5, and provided with the decorative bezel 10c and a lower cover 14 which covers the lower surface of the boss portion B.

As illustrated in FIGS. 1, 2, and 15, the airbag device 15 includes an airbag 38 which is inflated when an inflation gas flows inside, an inflator 22 which supplies the inflation gas to the airbag 38, a synthetic-resin airbag cover 25 which covers the folded airbag 38, a sheet-metal mounting base 16 which holds the airbag 38, the inflator 22, and the airbag cover 25, and a retainer 35.

Figure 4:
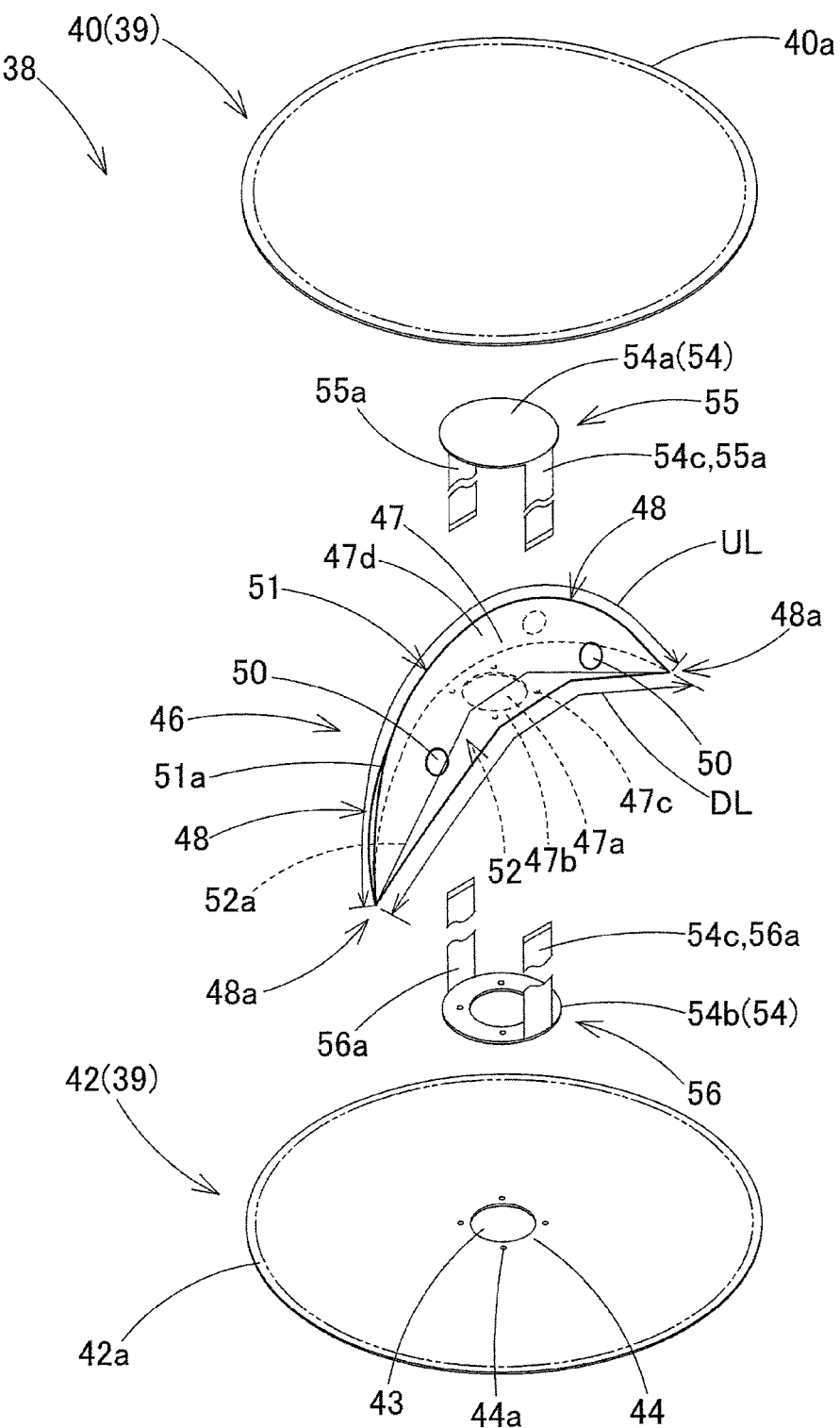
FIG. 4 is a perspective view schematically illustrating components of the airbag of the embodiment.
Figure 5:
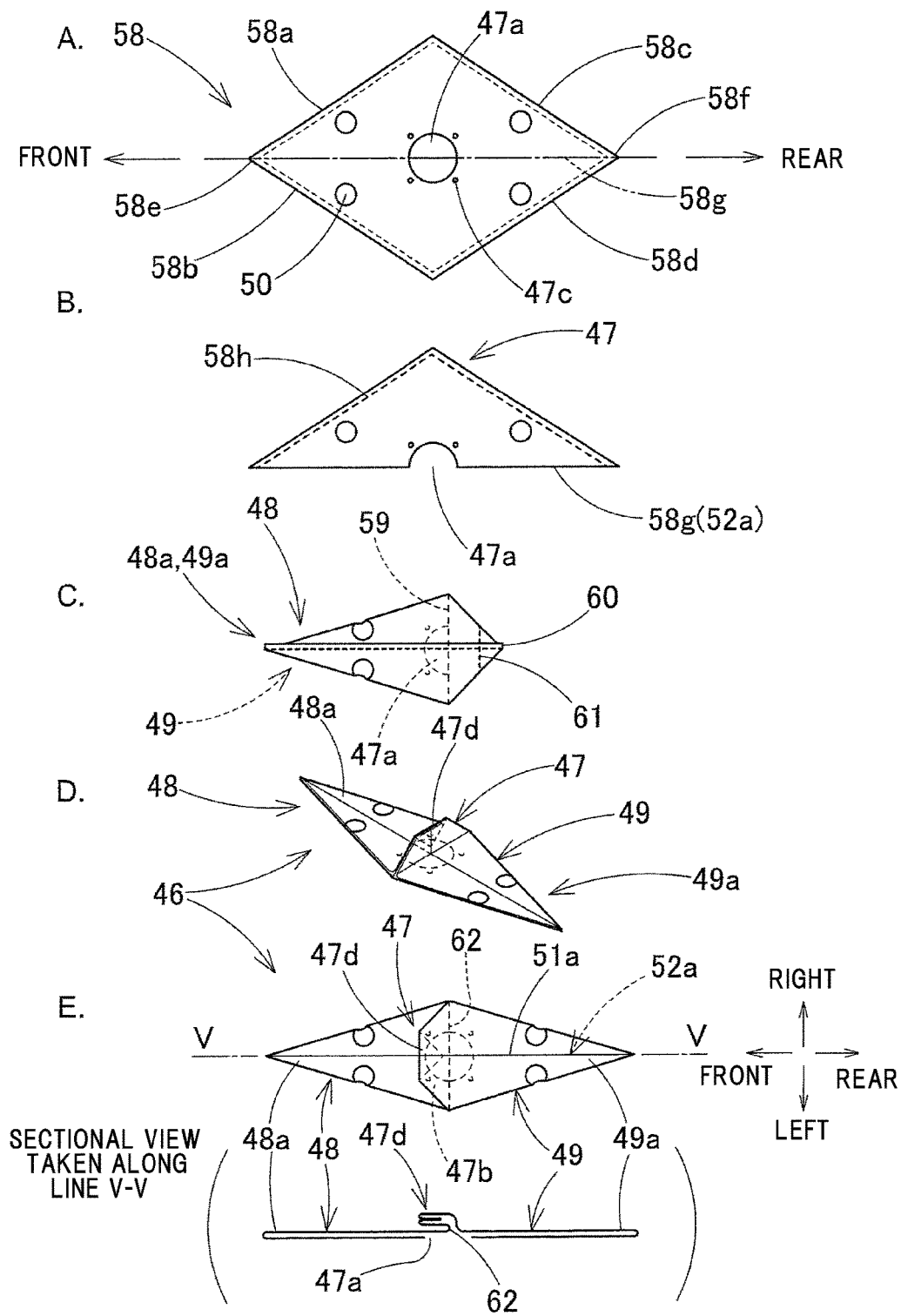
FIG. 5 is a view for describing a process of manufacturing an inner bag of the embodiment.
Figure 6:
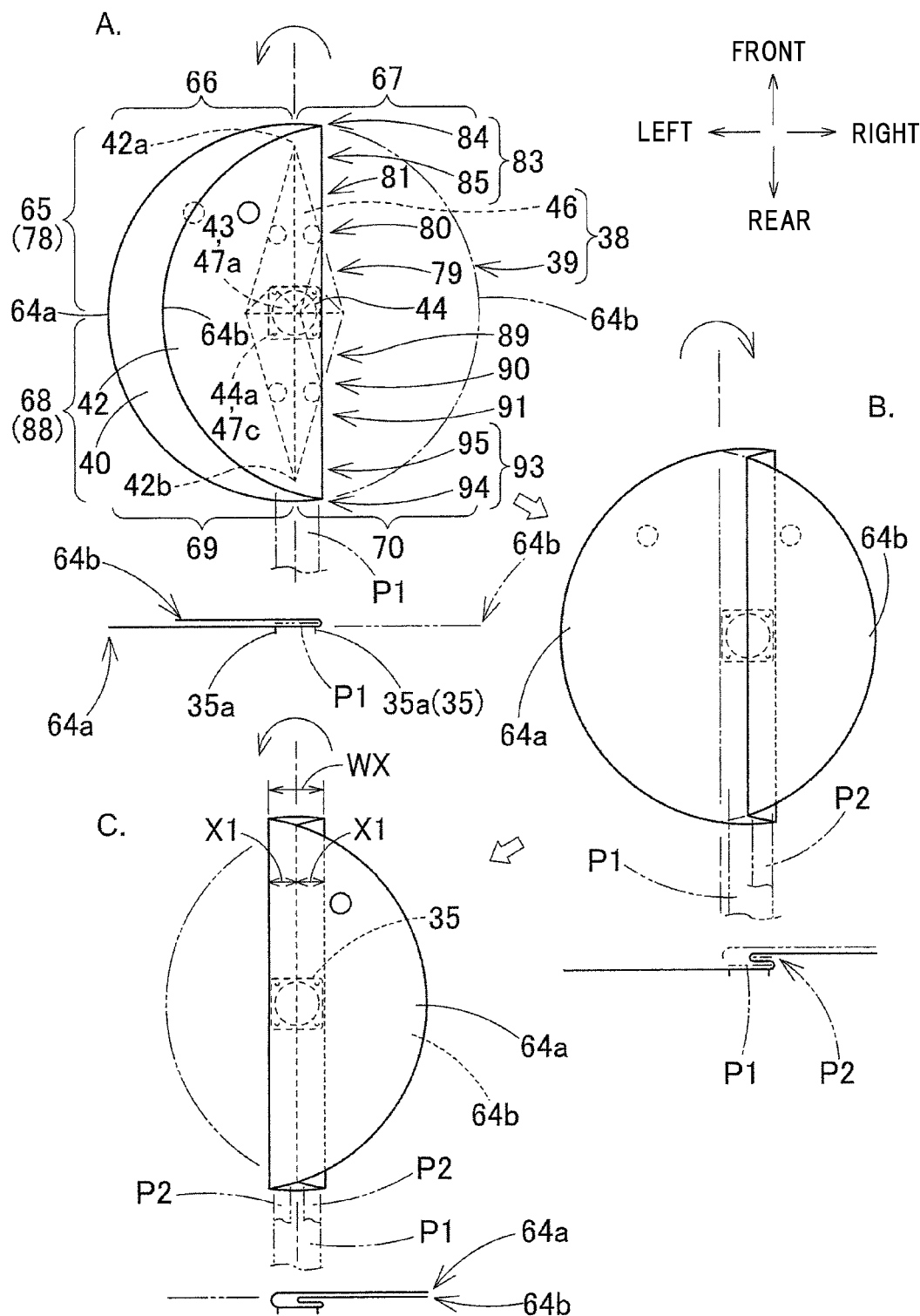
FIG. 6 is a view for describing a process of folding the airbag of the embodiment, and illustrate a horizontally-shortening folding process.

As illustrated in two-dot chain line of FIG. 15, the airbag 38 has a completely-inflated shape which is a substantially disc shape having the same thickness close to a spherical shape. As illustrated in FIGS. 4 to 6, the airbag 38 includes a circular opening (inflow opening) 43 on the lower side, and the circumferential periphery of the inflow opening 43 serves as a mounting portion 44. The airbag 38 is folded by a folding process (to be described later) to be a completely folded body 77, and is assembled in the airbag device 15. The mounting portion 44 together with the inflator 22 is fixedly mounted in the mounting base 16 by using the retainer 35.

The inflator 22 includes a cylindrical shaped main body 22a in which a plurality of gas discharge ports 22b which discharge the inflation gas are provided on the upper portion, and a quadrangular annular flange 22c protruding from the outer circumferential surface of the main body 22a.

The retainer 35 is made of a quadrangular annular sheet metal, and bolts 35a (see FIGS. 6 and 14) protrude from four corners thereof. The retainer 35 is provided inside the airbag 38. Each bolt 35a penetrates sequentially the mounting portion 44 of the airbag 38, the mounting base 16, and the flange 22c of the inflator 22, and the airbag 38 and the inflator 22 are mounted in the mounting base 16 by fastening the nut in each bolt 35a.

As illustrated in FIGS. 2 and 15, the mounting base 16 holds the airbag 38, the inflator 22, and the airbag cover 25, and mounts the airbag device 15 in the steering wheel body 1 by using an assembly portion 33. The mounting base 16 includes a plurality of locking portions 19 locking a mounting leg 30a of the airbag cover 25, and an assembly base 20 provided with the assembly portion 33 is provided in the both left and right sides and the rear side.

Each assembly portion 33 is used also as a horn switch body, and includes an assembly pin 33a locked in a mounting hole 2a (see FIGS. 15 and 21) of the cored bar 2, and a spring 33b biased upward. The assembly pin 33a is provided not to be pulled out to the cored bar 2, and to be stopped at the position thereof. Each assembly portion 33 is configured such that when the airbag device 15 is operated to descend, and the mounting base 16 descends, the assembly pin 33a does not descend, and predetermined contact points thereinside contact each other to operate a horn.

As illustrated in FIGS. 1 to 3, 15, and 21, the airbag cover 25 is made of synthetic resin such as olefin-based thermoplastic elastomer, and is provided in the upper surface of the boss portion B in the vicinity of the center of the steering wheel W. The airbag cover 25 includes a ceiling wall 26 which covers the upper side of the airbag 38 (completely folded body 77) stored in a folded state inside the boss portion B, and a side wall 30 which extends in a substantially quadrangular cylinder shape from the lower surface in the vicinity of the center of the ceiling wall 26 and covers the longitudinal and horizontal outer circumferential side of the folded completely folded body 77. The side wall 30 is provided with the mounting leg 30a, which is inserted and locked in the locking portion 19 of the mounting base 16, in the lower end, and is formed in a horizontally symmetrical shape.

The ceiling wall 26 is provided with a left door 27 and a right door 28, which are opened to the left and right sides, inside the side wall 30. A thin breakage expected portion 29 which is pressed by the inflating airbag 38 to be broken is provided around the left and right doors 27 and 28. The breakage expected portion 29 includes a boundary 29a which is provided longitudinally in a position of tip peripheries 27a and 28a close to the left door 27 and the right door 28 while detouring a decoration body 31 and is provided in the boundary of the left door 27 and the right door 28, and the front periphery 29b and the rear periphery 29c disposed in the front and rear peripheries of the left door 27 and the right door 28.

The decoration body 31 is formed of a hard synthetic resin such as a PP with high shape holding capacity or metal, and is mounted in the left door 27 by using a plurality of mounting legs (reference numeral omitted) protruding downward.

When the breakage expected portion 29 is pressed by the inflating airbag 38 to be broken, the tip peripheries 27a and 28a are separated, the left door 27 and the right door 28 are opened to the left and right sides with hinges 27b and 28b separate from the tip peripheries 27a and 28a of the left door 27 and the right door 28 set as a rotational center. The right door 28 is configured to be opened to rotatably move almost to the right side of the just beside by the hinge 28b provided to be rotated about the rotational shaft along the longitudinal direction. However, the left door 27 is configured such that the hinge 27b rotatably moves slightly rearward to the left side so as to avoid a state where the operating button 12a abuts strongly on the decoration body 31.

As illustrated in FIG. 4, the airbag 38 includes an outer bag 39 forming the outer circumferential wall of the airbag 38 and an inner bag 46 disposed inside the outer bag 39 to cover the inflow opening 43. The inner bag 46 includes a plurality of (in the embodiment, four) outflow openings 50 so that the outer bag 39 is inflated when an inflation gas G flowing inside through the inflow opening 43 flows out into the outer bag 39. The outer bag 39 and the inner bag 46 are formed of woven fabric such as polyester or polyamide with flexibility.

As illustrated in FIG. 4, the outer bag 39 is formed by two of a driver-side wall 40 and a vehicle-side wall 42 which have a circular shape when being deployed flatly. The outer bag 39 is configured to be inflated in an elliptically spherical bag shape by coupling the outer circumferential peripheries 40a and 42a to each other by using a suture. A driver-side wall 40 is positioned on the driver side when the outer bag 39 is completely inflated, and the vehicle-side wall 42 is positioned on the ring portion R side when the outer bag 39 is completely inflated. The inflow opening 43 through which the inflation gas flows into the airbag 38 is provided in the center of the vehicle-side wall 42, and four mounting holes 44a are provided in the circumferential periphery thereof. Thus, the mounting portion 44 for mounting the completely folded body 77 of the airbag 38 in the boss portion B of the steering wheel W through the mounting base 16 and the assembly portion 33 is formed.

A regulation member 54 which regulates the separation distance from the mounting portion 44 in the center of the driver-side wall 40 when the outer bag 39 is completely inflated is provided in the mounting portion 44. The regulation member 54 includes an upper coupling portion 54a sewed in the center of the driver-side wall 40, a lower coupling portion 54b sewed in the mounting portion 44, and two coupling pieces 54c which couple the upper and lower coupling portions 54a and 54b and regulate the separation distance of the center of the driver-side wall 40 and the mounting portion 44. The regulation members 54 of the embodiment are formed by an upper portion 55 and a lower portion 56 which are two-divided in each coupling piece 54c. Two of the coupling pieces 54c and 54c are configured by coupling band pieces 55a and 56a extending from the upper portion 55 and the lower portion 56 to each other.

Figure 3:
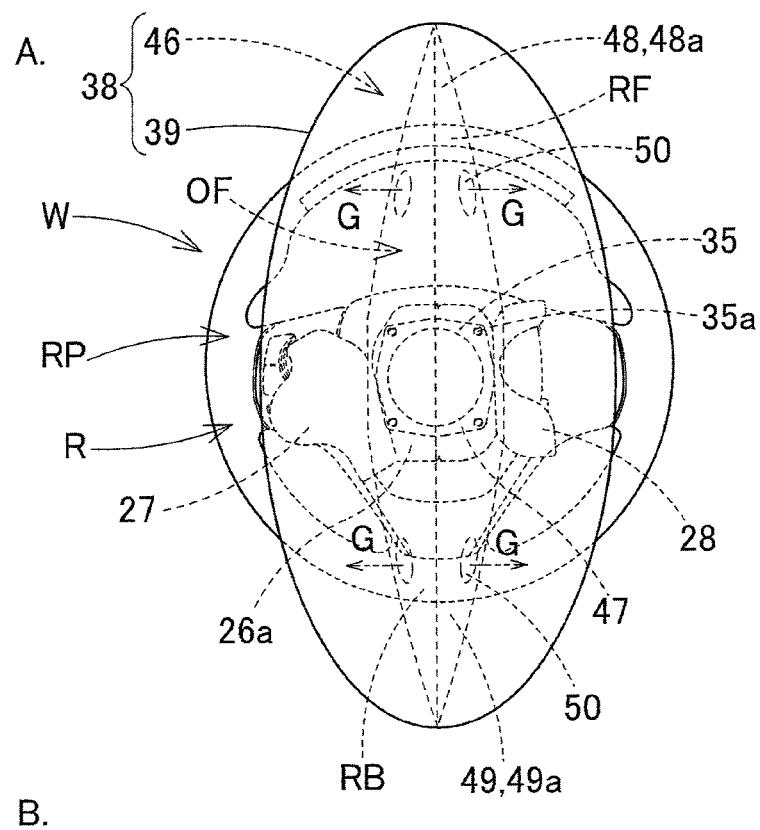
FIG. 3 is a schematic view for describing a state where the completely folded body of the airbag of the embodiment is inflated.
Figure 3:
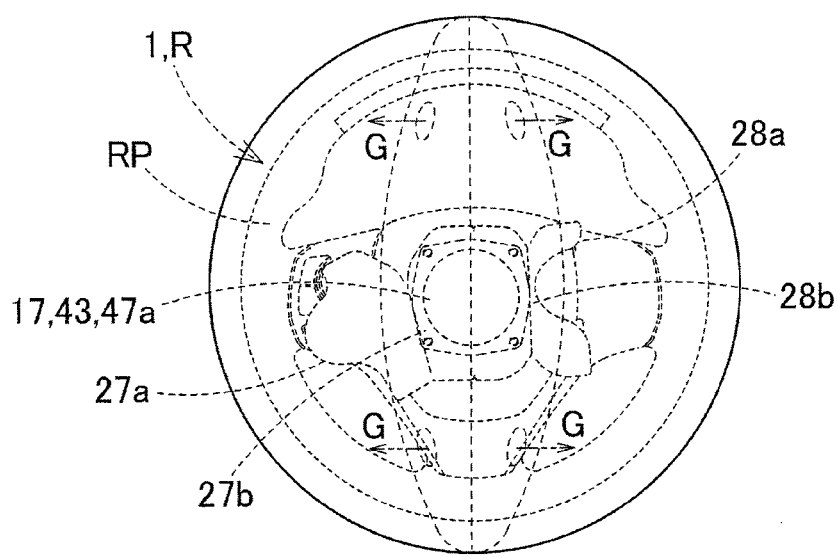

As illustrated in FIGS. 3, 4, and Section B of 17, the inner bag 46 includes, as a shape at the time of inflation, the central portion 47 which is provided to cover the inflow opening 43 and a front-side arm (front-side tapered portion) 48 and a rear-side arm (rear-side tapered portion) 49 which extend in a tapered shape from the central portion 47 to both front and rear sides in a diametrical direction of the inflow opening 43.

The central portion 47 is provided with a communication opening 47a communicating with the inflow opening 43. A mounting portion 47b on the inner bag side which is mounted together with the mounting portion 44 of the outer bag 39 in the mounting portion 18 of the mounting base 16 on the boss portion B side is provided in the circumferential periphery of the communication opening 47a. Similarly to the mounting portion 44, the mounting portion 47b includes a mounting hole 47c into which each bolt 36 of the retainer 35 is inserted.

The front-side arm 48 and the rear-side arm 49 have the outflow openings 50 which admit the inflation gas G flowing through the communication opening 47a to flow out into the outer bag 39. The outflow openings 50 are formed in the both left and right surfaces of the front-side arm 48 and the rear-side arm 49 such that the inflation gas G flows out to both sides in the horizontal direction orthogonal to the longitudinal direction as a direction of providing the front-side arm 48 and the rear-side arm 49. The opening area of the outflow opening 50 is set such that the completely-inflated shape of the inner bag 46 is secured when the inflation gas G from the communication opening 47a flows inside, and the inflation gas G can flow out through the outflow opening 50 to the outer bag 39. When the outer bag 39 is completely inflated, the inner bag 46 has the same inner pressure as that of the outer bag 39. Therefore, the inner bag 46 becomes in a deflated state while the completely-inflated shape is not maintained (see Section C of FIG. 17).

As illustrated in FIG. 4, in the inner bag 46, the longitudinal length dimensions of the upper side and the lower side which are obtained by coupling the tips 48a and 49a of the front-side arm 48 and the rear-side arm 49 are set such that a longitudinal upper-side length dimension LU of an upper-side outer circumferential wall 51 passing by the central portion 47 is larger than a longitudinal lower-side length dimension LD of a lower-side outer circumferential wall 52 passing by the mounting portion 47b.

The inner bag 46 is formed from a rhombic-shaped inner bag base cloth 58 illustrated in FIG. 5. The communication opening 47a and the mounting hole 47c are formed in the base cloth 58 in advance. First, as illustrated in Sections A and B of FIG. 5, the base cloth 58 is folded twice from the flatly-deployed state by attaching a crease 58g in a line where an apex 58e on the front-end side is connected with an apex 58f on the rear-end side. A sewing portion 58h is provided such that the left and right front peripheries 58a and 58b are overlapped with each other, the left and right rear peripheries 58c and 58d are overlapped with each other, and the overlapped peripheries are sewed to each other. Thereafter, as illustrated in Sections B and C of FIG. 5, the tips 48a and 49a of the front-side arm 48 and the rear-side arm 49 of the central portion 47 are folded to each other by attaching the crease 59 on the communication opening 47a side, and a sewing portion 61 parallel to the crease 59 is provided in the vicinity of the crease 59 on a top portion 60 side. As illustrated in Sections C and D of FIG. 5, when inversion is performed by using the communication opening 47a, the inner bag 46 can be manufactured. As illustrated in Section E of FIG. 5, when the vicinity of the top portion 47d of the central portion 47 of the inner bag 46 is folded to the mounting portion 47b side by attaching a crease 62, the inner bag 46 can be formed to be flatly deployed not in bulky shape.

A central ridge portion 51a of the upper-side outer circumferential wall 51 in the inner bag 46 is formed from the sewing portion 58h of the left and right front peripheries 58a and 58b and the left and right rear periphery 58c and 58d in the inner bag base cloth 58. The central line portion 52a of the lower-side outer circumferential wall 52 is formed from the crease 58g of the inner bag base cloth 58.

When a portion where the sewing portion 61 is disposed is separated from the crease 59 to the top portion 60 side, the upper-side length dimension LU can be larger than the lower-side length dimension LD. Inversely, when the portion where the sewing portion 61 is disposed approaches the crease 62, a dimensional difference between the upper-side length dimension LU and the lower-side length dimension LD becomes small. When the inner bag 46 is completely inflated, the tips 48a and 49a of the front-side arm 48 and the rear-side arm 49 press the outer bag 39 downward by stronger pressing force in proportion to the dimensional difference between the upper-side length dimension LU and the lower-side length dimension LD. For this reason, when the sewing portion 61 is not provided, the dimensional difference can be the largest. In the case, each of the tips 48a and 49a can press the outer bag 39 downward by the strongest pressing force.

In such a behavior, the longitudinal upper-side length dimension LU of the central ridge portion 51a in the horizontally central portion in the upper-side outer circumferential wall 51 passing by the central portion 47 of the inner bag 46 is larger than the longitudinal lower-side length dimension LD of the central line portion 52a in the horizontally central portion in the lower-side outer circumferential wall 52 passing by the mounting portion 47b. Thus, the upper-side outer circumferential wall 51 is easily inflated freely compared to the lower-side outer circumferential wall 52, and the lower-side outer circumferential wall 52 has the mounting portion 47b pressed by the retainer 35 so as to be hardly inflated freely. As a result, the upper-side outer circumferential wall 51 exerts a tension that presses downward the tips 48a and 49a of the front-side arm 48 and the rear-side arm 49. The front-side arm 48 and the rear-side arm 49 press the inner circumferential surface of the outer bag 39 on the respective tips 48a and 49a.

The inner bag base cloth 58 is formed of woven fabric such as polyester or polyamide with flexibility which forms the outer bag 39. However, in order to improve thermal resistance, a coating layer formed of silicone rubber and the like is formed on the inner circumferential surface side of the inner bag 46.

In the middle of inflation of the airbag 38, in the inner bag 46, the longitudinal length dimension is slightly shorter than the diametrical dimension of the vehicle-side wall 42 such that the tips 48a and 49a of the front-side arm 48 and the rear-side arm 49 can press the vicinity of front and rear peripheries 42a and 42b of the vehicle-side wall 42 of the outer bag 39 (see FIG. 6). Thus, the inner bag 46 can be put on a ring surface RP on the upper surface side of the front portion RF and a rear portion RB of the ring portion R (see FIG. 16).

The description will be described about manufacturing the airbag 38. At the time of manufacturing the outer bag 39, the upper portion 55 forming the regulation member 54 is coupled with the driver-side wall 40 by sewing, the lower portion 56 forming the regulation member 54 is coupled with the vehicle-side wall 42 by sewing, and the inflow opening 43 and the mounting hole 44a are formed. The driver-side wall 40 and the vehicle-side wall 42 are overlapped by contacting the surfaces on the outer circumferential surface side with each other, and the outer circumferential peripheries 40a and 42a are coupled to each other. Thereafter, the coupling margin (sewing margin) is reversed by using the inflow opening 43 not to be exposed in the outer circumferential surface, and the band pieces 55a and 56a corresponding to the upper portion 55 and the lower portion 56 are coupled to each other, thereby manufacturing the outer bag 39. The above-described inner bag 46 manufactured as illustrated in FIG. 5 is stored inside the outer bag 39.

At that time, in the inner bag 46, the communication opening 47a and the inflow opening 43 of the outer bag 39 are overlapped, the mounting portions 47b and 44 are overlapped with each other, and the front and rear tapered portions 48 and 49 extend in the diametrical direction of the inflow opening 43 along the longitudinal direction. That is, as illustrated in Section E of FIG. 5 and Section A of FIG. 6, in a state where the top portion 47d is folded in the crease 62, the central ridge portion 51a of the upper-side outer circumferential wall 51 and the central line portion 52a of the lower-side outer circumferential wall 52 are disposed to be overlapped in the diametrical direction of the inflow opening 43 along the longitudinal direction, and the inner bag 46 is stored in the outer bag 39.

The inner bag 46 is stored in the outer bag 39 in a state where the retainer 35 is stored in the inner bag 46 in advance, and the bolt 35a protrudes from each mounting hole 47c outside the inner bag 46. Thus, the bolt 35a protrudes through each mounting hole 44a of the outer bag 39 (see FIG. 6).

Figure 7:
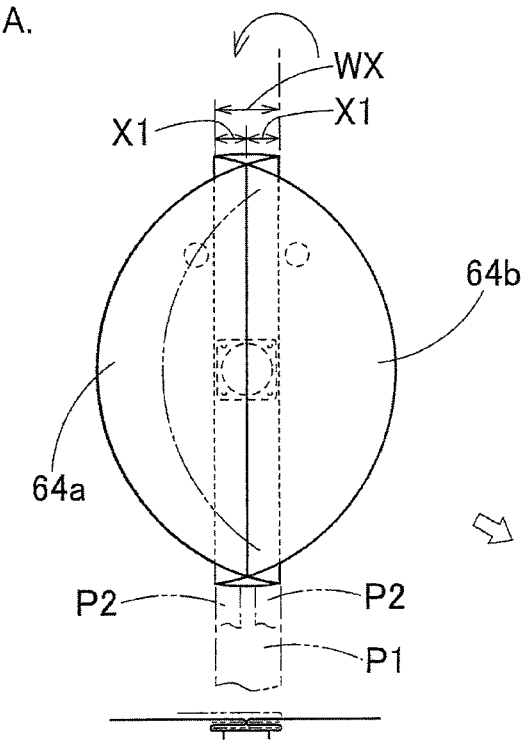
FIG. 7 is a view for describing the horizontally-shortening folding process in the process of folding the airbag of the embodiment, and illustrates a process after FIG. 6.
Figure 7:
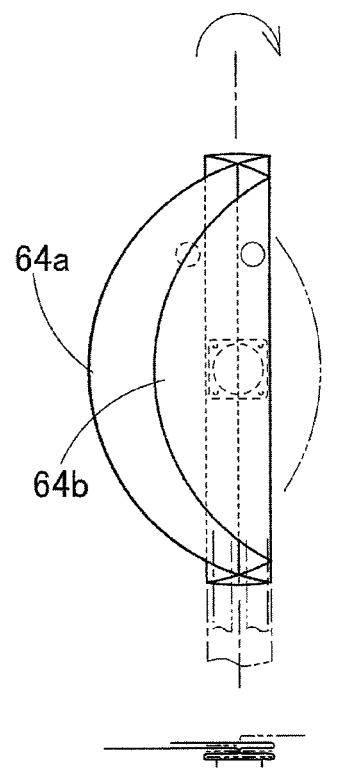
Figure 7:
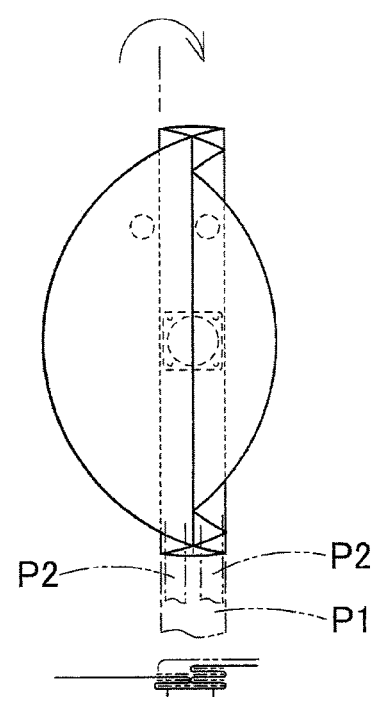
Figure 8:
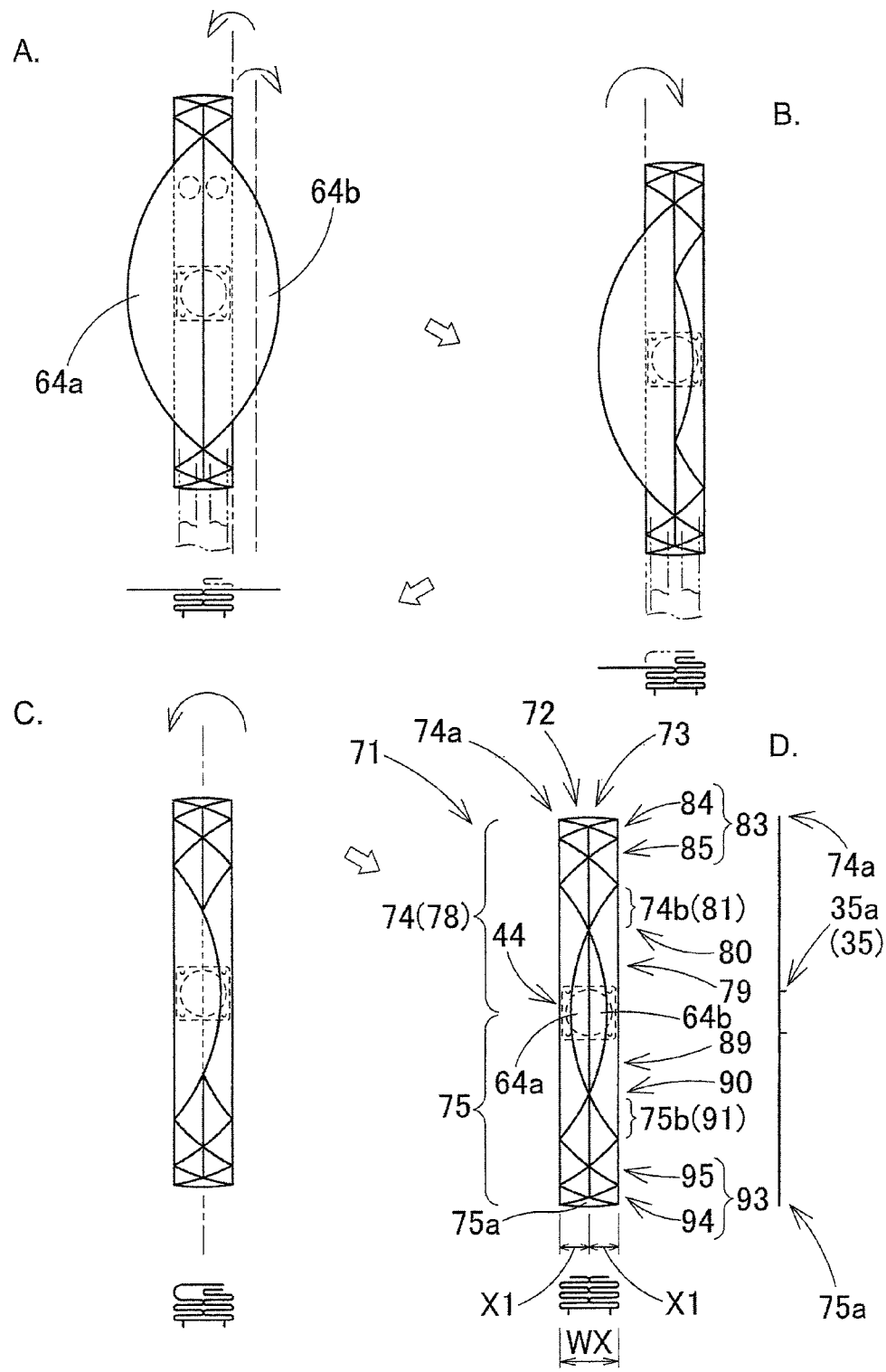
FIG. 8 is a view for describing the horizontally-shortening folding process in the process of folding the airbag of the embodiment, and illustrates a process after FIG. 7.

In a case where the completely folded body 77 is formed by folding the airbag 38, first, the driver-side wall 40 and the vehicle-side wall 42 of the outer bag 39 are flatly deployed, and the inner bag 46 is also deployed flatly as illustrated in Section E of FIG. 5 and then is stored inside the outer bag 39 (see the two-dot chain line of Section A of FIG. 6), thereby preparing an initial deployed body 64. In order that the initial deployed body 64 is set to have such a width dimension that can be stored in the airbag device 15, the completely folded body 77 is formed through a horizontally-shortening folding process of shortening the horizontal dimension to a predetermined horizontal width dimension WX as illustrated in FIGS. 6 to 8, and a longitudinally-shortening folding process of shortening the longitudinal dimension to a predetermined longitudinal width dimension WY as illustrated in FIGS. 9 to 13.

Figure 14:
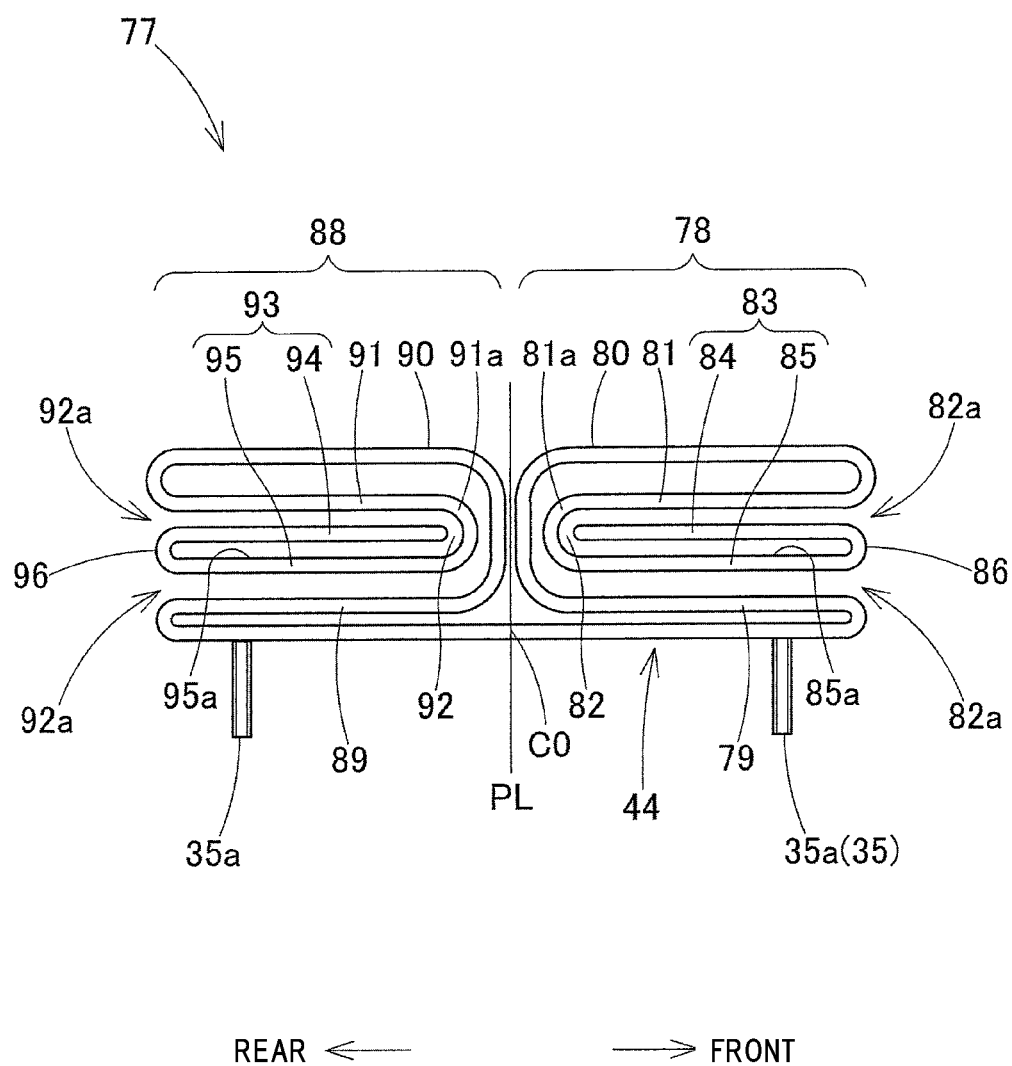
FIG. 14 is a side view schematically illustrating the front-side folded portion and the rear-side folded portion formed by the longitudinally-shortening folding process of the embodiment.

As illustrated in FIG. 14, the final completely folded body 77 is in a state where a front-side folded portion 78 on the front side and a rear-side folded portion 88 on the rear side in the upper portion of the mounting portion 44 are provided. In the initial deployed body 64 in a state where the driver-side wall 40 and the vehicle-side wall 42 are overlapped to be flatly deployed, as illustrated in Section A of FIG. 6, the front-side folded portion 78 is formed from a front overlapped portion 65 on the front side of potions divided longitudinally with the mounting portion 44 as a center, and the rear-side folded portion 88 is formed from a rear overlapped portion 68 on the rear side when divided longitudinally with the mounting portion 44 as a center.

The front-side folded portion 78 includes a mounting-portion-side folded portion 79 near the mounting portion 44, a tip 83 separated longitudinally from the mounting portion 44 of the front overlapped portion 65, and a central folded portion 80 between the tip 83 and the mounting-portion-side folded portion 79. The front-side folded portion 78 is folded such that the tip 83 is stored in a dent portion 82, in which a front side is open and a rear side is dented, between the mounting-portion-side folded portion 79 and the central folded portion 80.

The tip 83 includes a leading edge 84 separated the farthest from the mounting portion 44 in the longitudinal direction and a tip root-side portion 85 connected with the leading edge 84. The leading edge 84 is inverted rearward to a center CO side of the mounting portion 44 by folding the upper side of the tip root-side portion 85 by the crease 86.

In the case of the embodiment, the rear-side folded portion 88 is folded to be axisymmetric (longitudinally symmetric) to the front-side folded portion 78 with a line along the vertical direction in the longitudinal center of the mounting portion 44 as a central reference line CL. That is, the rear-side folded portion 88 includes a mounting-portion-side folded portion 89 near the mounting portion 44, a tip 93 separated longitudinally from the mounting portion 44 of the rear overlapped portion 68, and a central folded portion 90 between the tip 93 and the mounting-portion-side folded portion 89. The rear-side folded portion 88 is folded so as the tip 93 to be stored in a dent portion 92, in which the rear side is open and the front side is dented, between the mounting-portion-side folded portion 89 and the central folded portion 90.

The tip 93 includes a leading edge 94 separated the farthest from the mounting portion 44 in the longitudinal direction and a tip root-side portion 95 connected with the leading edge 94. The leading edge 94 is inverted rearward to the center CO side of the mounting portion 44 by folding the upper side of the tip root-side portion 95 by the crease 96.

The description will be described in detail about a folding process to the completely folded body 77. First, as illustrated in FIGS. 6 to 8, the horizontally-shortening folding process relates to the front overlapped portion 65 and the rear overlapped portion 68 obtained by deploying the driver-side wall 40 and the vehicle-side wall 42 in the flatly overlapped state. Left portions 66 and 69 and right portions 67 and 70, which are on the left side and the right side of the mounting portion 44 respectively, are bellows-folded to have folding widths X1 and X1, each of which is a half the horizontal width dimension WX corresponding to the storage portion, forming a horizontally-shortened body 71 illustrated in Section D of FIG. 8.

Specifically, in the horizontally-shortening folding process, a left periphery 64a of the left portions 66 and 69 and a right periphery 64b of the right portions 67 and 70 in the front overlapped portion 65 and the rear overlapped portion 68 of the initial deployed body 64 are sequentially folded to the opposite right side and the opposite left side to leave the folding widths X1 and X1, and folded inversely to leave the folding widths X1 and X1. Then, the left periphery 64a and the right periphery 64b are bellows-folded back to the horizontally opposite sides to leave the folding widths X1 and X1, thereby forming the horizontally-shortened body 71 illustrated in Section D of FIG. 8. The horizontally-shortened body 71 is configured such that a left folded portion 72 and a right folded portion 73, which are long longitudinally and are bellows-folded to have the folding width X1, are provided in the respective left and right sides of the center of the mounting portion 44.

In addition, in the bellows-folding method, before attaching the crease of bellows-folding, a pressing plate P1 slightly smaller than the width dimension WX and a pressing plate P2 slightly smaller than the folding width X1 are appropriately placed on a portion where the crease on the mounting portion 44 of the initial deployed body 64 is attached. Simply, a right periphery 64b and a left periphery 64a are stretched to the horizontally opposite sides, and returned back, whereby the horizontally-shortened body 71 can be easily formed. The pressing plates P1 and P2 are pulled out after the horizontally-shortened body 71 is formed.

Thereafter, in the longitudinally-shortening folding process, the horizontally-shortened body 71 is folded to have the longitudinal width dimension WY of the storage portion. As illustrated in FIGS. 9 to 13, a front portion 74 and a rear portion 75 on the front side of the mounting portion 44 of the horizontally-shortened body 71 are folded, and the front-side folded portion 78 and the rear-side folded portion 88 are disposed in the front and rear sides of the upper side of the mounting portion 44.

In the case of the embodiment, the upper and lower sides of predetermined portions 74b and 75b of the front portion 74 and the rear portion 75 in the horizontally-shortened body 71 are nipped by pressing plates P4 and P5. The nipped portions 74a and 75b are disposed on the front and rear side of the mounting portion 44 in the vertically inverted state. The tip 74a and 75a of the front portion 74 and the rear portion 75 are folded to be inserted to the lower side of the nipped portion, thereby forming the completely folded body 77.

The nipped portions 74b and 75b of the front portion 74 and the rear portion 75 are a portion of the central folded portions 80 and 90 of the front-side folded portion 78 and the rear-side folded portion 88. Specifically, the nipped portions 74b and 75b are connected with the tip root-side portions 85 and 95, respectively, and serve as upper-side contact portions 81 and 91 contacting the upper sides of the leading edges 84 and 94.

The tips 74a and 75a of the front portion 74 and the rear portion 75 serve as the leading edges 84 and 94 in the tips 83 and 93 of the front-side folded portion 78 and the rear-side folded portion 88, respectively.

The description will be given in detail about the longitudinally-shortening folding process. The folding process of the front-side folded portion 78 and the rear-side folded portion 88 includes a nipping process, a rotating process, and a folding process.

Figure 9:
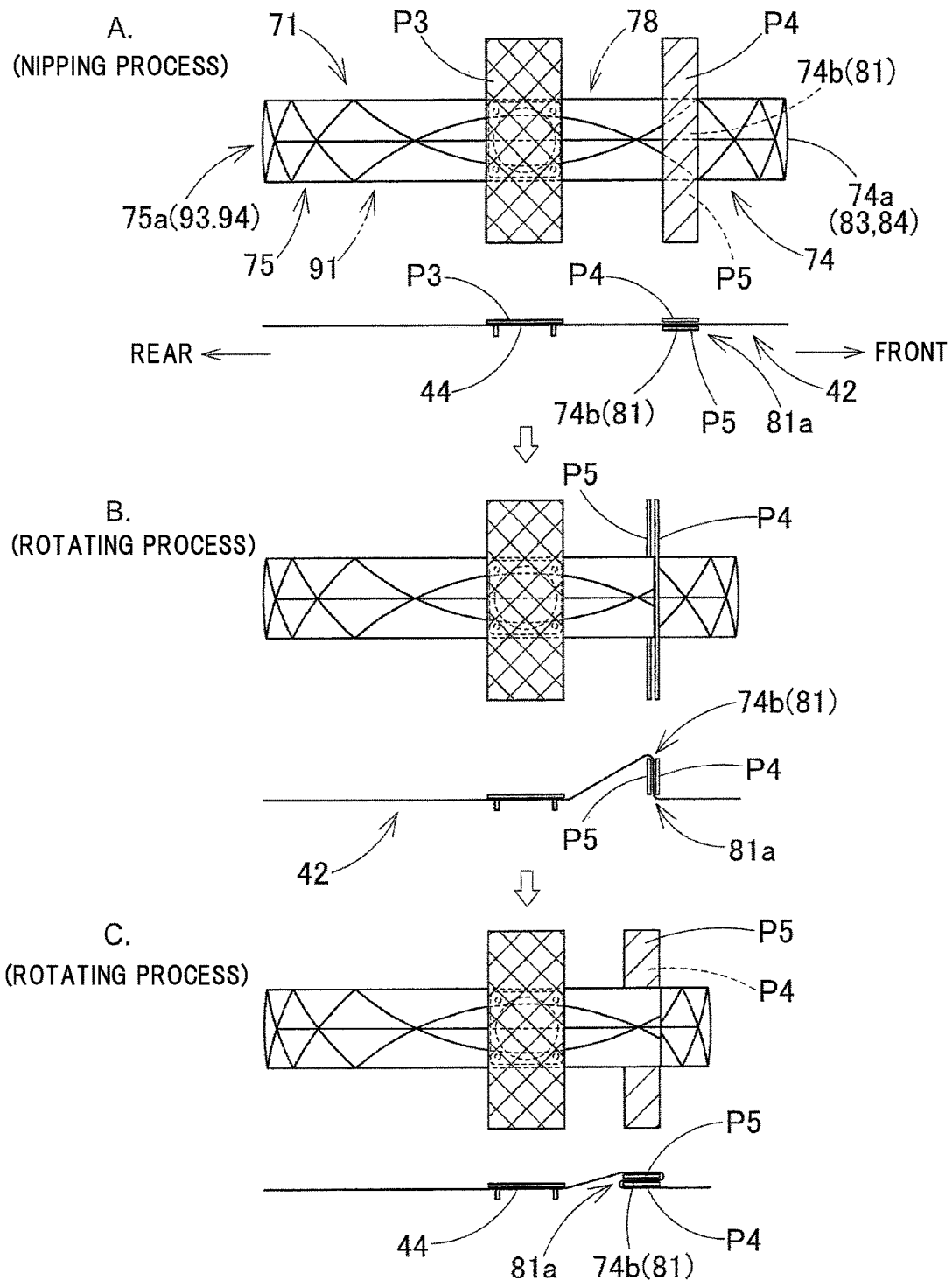
FIG. 9 is a view for describing a process of forming a front-side folded portion in a longitudinally-shortening folding process in the process of folding the airbag of the embodiment.

In the nipping process of forming the front-side folded portion 78, first, as illustrated in Section A of FIG. 9, the mounting portion 44 of the flatly-deployed horizontally-shortened body 71 is pressed by a pressing plate P3 which has a width dimension slightly smaller than the longitudinal width dimension WY of the storage portion. The upper and lower sides of a nipping portion 74b (upper-side contact portion 81) of the front portion 74 are nipped by the pressing plates P4 and P5, and the nipping process is ended.

Figure 10:
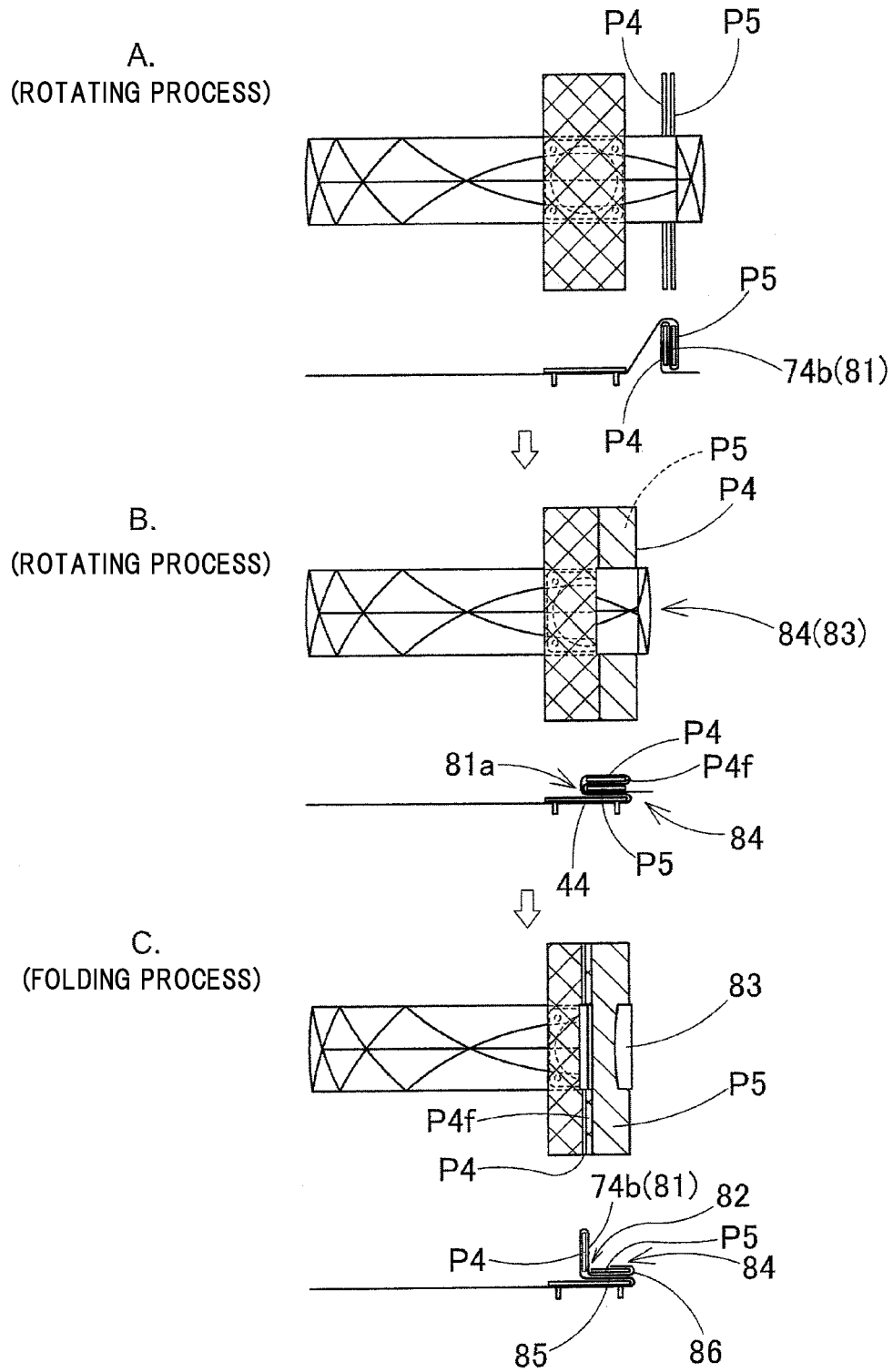
FIG. 10 is a view for describing a process of forming the front-side folded portion in the longitudinally-shortening folding process of the airbag of the embodiment, and illustrates a process after FIG. 9.

In the rotating process, as illustrated in Sections B and C of FIG. 9, and Sections A and B of FIG. 10, the front periphery 81a of the nipped upper-side contact portion 81 is rotated to the vehicle-side wall 42 side to be vertically inverted and is disposed on the rear side. The nipped upper-side contact portion 81 is disposed on the front side of the upper side of the mounting portion 44, and the rotating process is ended.

Figure 11:
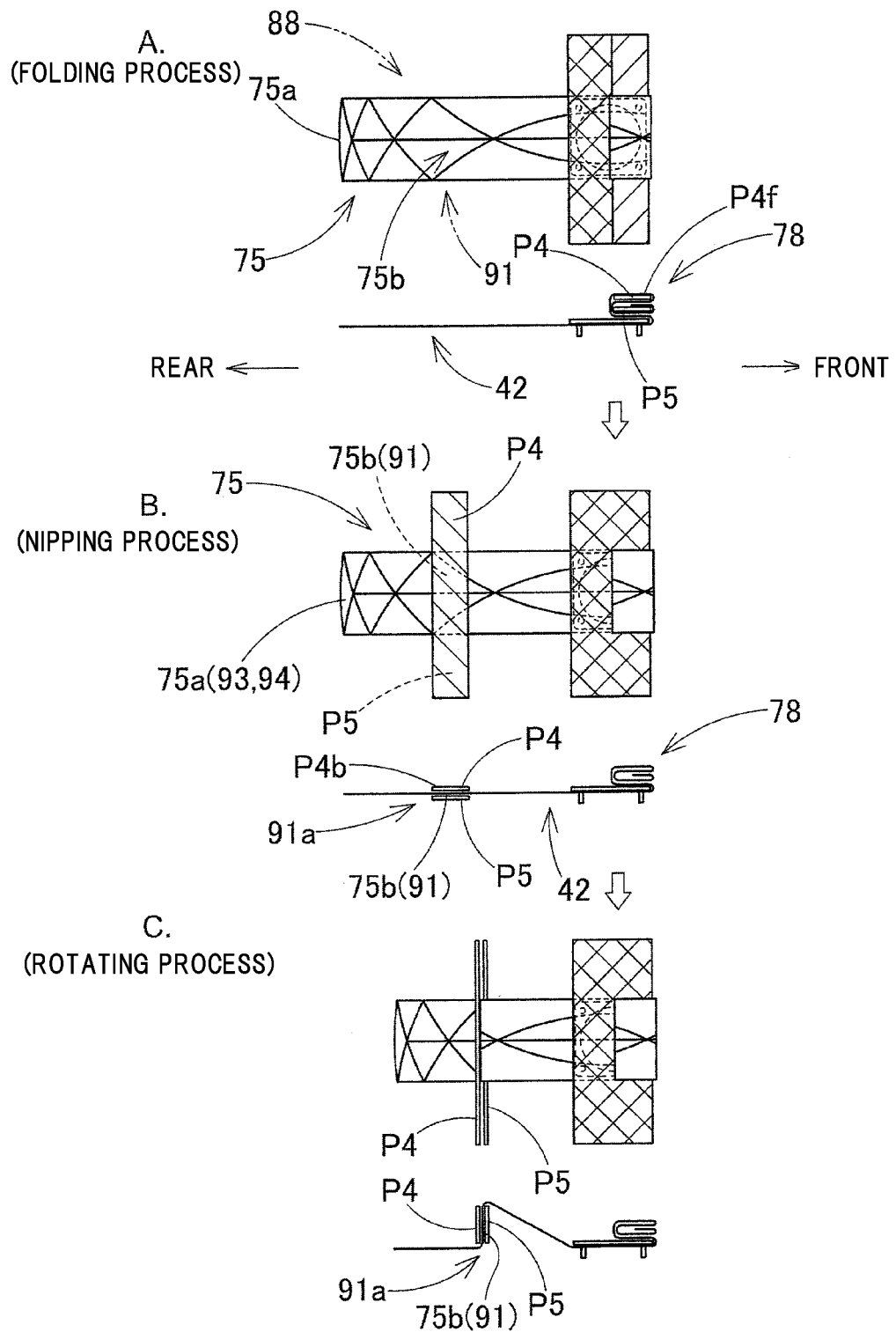
FIG. 11 is a view for describing a process of forming the front-side folded portion and forming a rear-side folded portion in the longitudinally-shortening folding process of the airbag of the embodiment, and illustrates a process after FIG. 10.

As illustrated in Section C of FIG. 10 and Section A of FIG. 11, in the folding process, the front periphery P4f of the pressing plate P4 is rotated to the upper and rear side to be opened. A tip 74a (leading edge 84) is folded by attaching the crease 86 between the tip 74a and the tip root-side portion 85, and is inserted to the lower position of the upper-side contact portion 81. The pressing plate P4 is overlapped on the pressing plate P5 to be returned to a state before rotation, and the folding process is ended.

When the folding process is performed, the front-side folded portion 78 is formed. The pressing plates P4 and P5 may remain until the rear-side folded portion 88 is formed, and may be pulled out if the folding is not collapsed.

In the nipping process of forming the rear-side folded portion 88, first, as illustrated in Section B of FIG. 11, the upper and lower sides of a nipping portion 75b (upper-side contact portion 91) of the front portion 74 of the flatly-deployed horizontally-shortened body 71 are nipped by the pressing plates P4 and P5.

Figure 12:
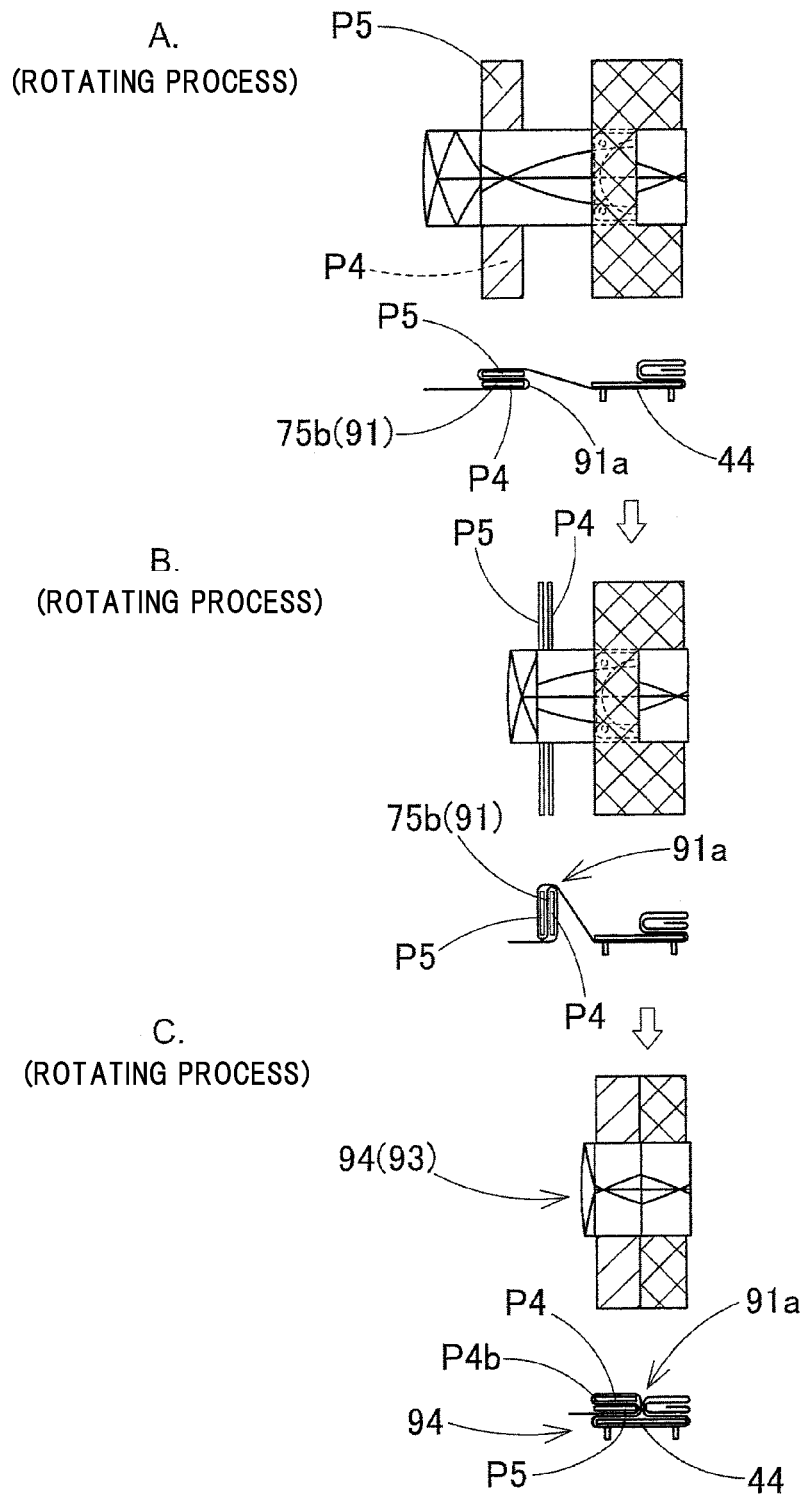
FIG. 12 is a view for describing a process of forming the rear-side folded portion in the longitudinally-shortening folding process of the airbag of the embodiment, and illustrates a process after FIG. 11.

In the rotating process, as illustrated in Section C of FIG. 11 and FIG. 12, the rear periphery 91a of the nipped upper-side contact portion 91 is rotated to the vehicle-side wall 42 side to be vertically inverted and is disposed on the front side, and the nipped upper-side contact portion 91 is disposed on the rear side of the upper side of the mounting portion 44.

Figure 13:
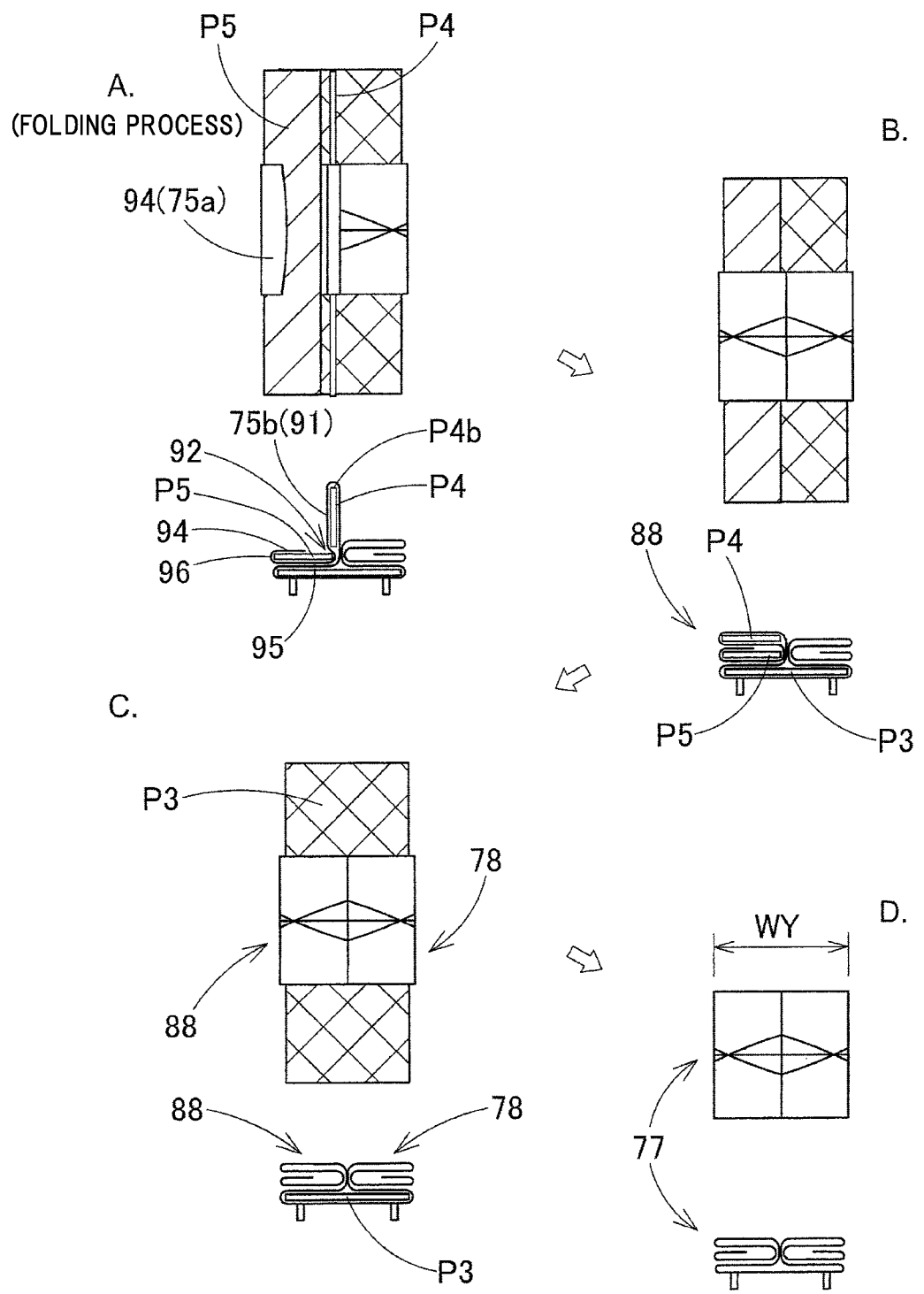
FIG. 13 is a view for describing a process of forming the rear-side folded portion of the longitudinally-shortening folding process of the airbag of the embodiment, and illustrates a process after FIG. 12.

As illustrated in Sections A and B of FIG. 13, in the folding process, the rear periphery P4b of the pressing plate P4 is rotated to the upper and front side to be opened. A tip 75a (leading edge 94) is folded by attaching the crease 96 between the tip 75a and the tip root-side portion 95, and is inserted to the lower position of the upper-side contact portion 91. The pressing plate P4 is overlapped on the pressing plate P5 to be returned to a state before rotation.

When the folding process is performed, the rear-side folded portion 88 is formed, and the pressing plates P3, P4, and P5 are pulled out, whereby the completely folded body 77 is formed as illustrated in Section D of FIGS. 13 and 14.

The folded completely folded body 77 is enclosed with a folding collapse preventing member (not illustrated) not to be collapsed. The completely folded body 77 is disposed on the mounting base 16 having been assembled with the horn switch body 33 so that each bolt 35a of the retainer 35 protrudes from the mounting portion 18 of the mounting base 16. The main body 22a of the inflator 22 is inserted from below into an insertion hole 17 of the mounting base 16, the bolt 35a penetrates the flange 22c, and the nut (not illustrated) is fastened in the bolt 35a. Thus, the completely folded body (airbag 38) 77 and the inflator 22 can be stored on the mounting base 16 as the storage portion, and the completely folded body (airbag 38) 77 and the inflator 22 can be mounted by using the retainer 35. The completely folded body (airbag 38) 77 is covered with the airbag cover 25, and each mounting leg 30a of the side wall 30 is locked in the locking portion 19 of the mounting base 16, thereby assembling the airbag device 15. In mounting the airbag device M1 in the vehicle, when the airbag device 15 is mounted in advance in the steering wheel body 1 fastened in the steering shaft SS, the airbag device 15 can be mounted in the vehicle (see FIG. 15).

At the time of mounting, in order that a positive electrode side of a horn operating circuit is conducted electronically with the horn switch body 33, a lead wire (not illustrated) extending from the steering wheel body 1 is connected to the mounting base 16, or a lead wire (not illustrated) extending from a control circuit operating the inflator 22 is connected to the inflator 22. The decorative bezel 10 and the operating button group 12 are assembled in advance in the steering wheel body 1, and the airbag device 15 is mounted in the steering wheel body 1, thereby completing the assembly of the steering wheel W itself.

After the steering wheel W mounted with the airbag device 15 is mounted in the vehicle, an operation signal is input to the inflator 22, and the inflation gas G is discharged from the gas discharge port 22*b*. Then, the airbag 38 is inflated, and the inflating airbag 38 presses the breakage expected portion 29 to be broken. As illustrated in the two-dot chain line of FIG. 1, the left door 27 and the right door 28 are opened to the both left and right sides with the hinges 27*b* and 28*b* as a rotation center respectively, and the airbag 38 protrudes from the opening 26*a* (see FIG. 3 and Section A of FIG. 16) between the left door 27 and the right door 28 and is inflated to form a completely-inflated shape that can be supported by the upper surface RP of the ring portion R.

Figure 16:
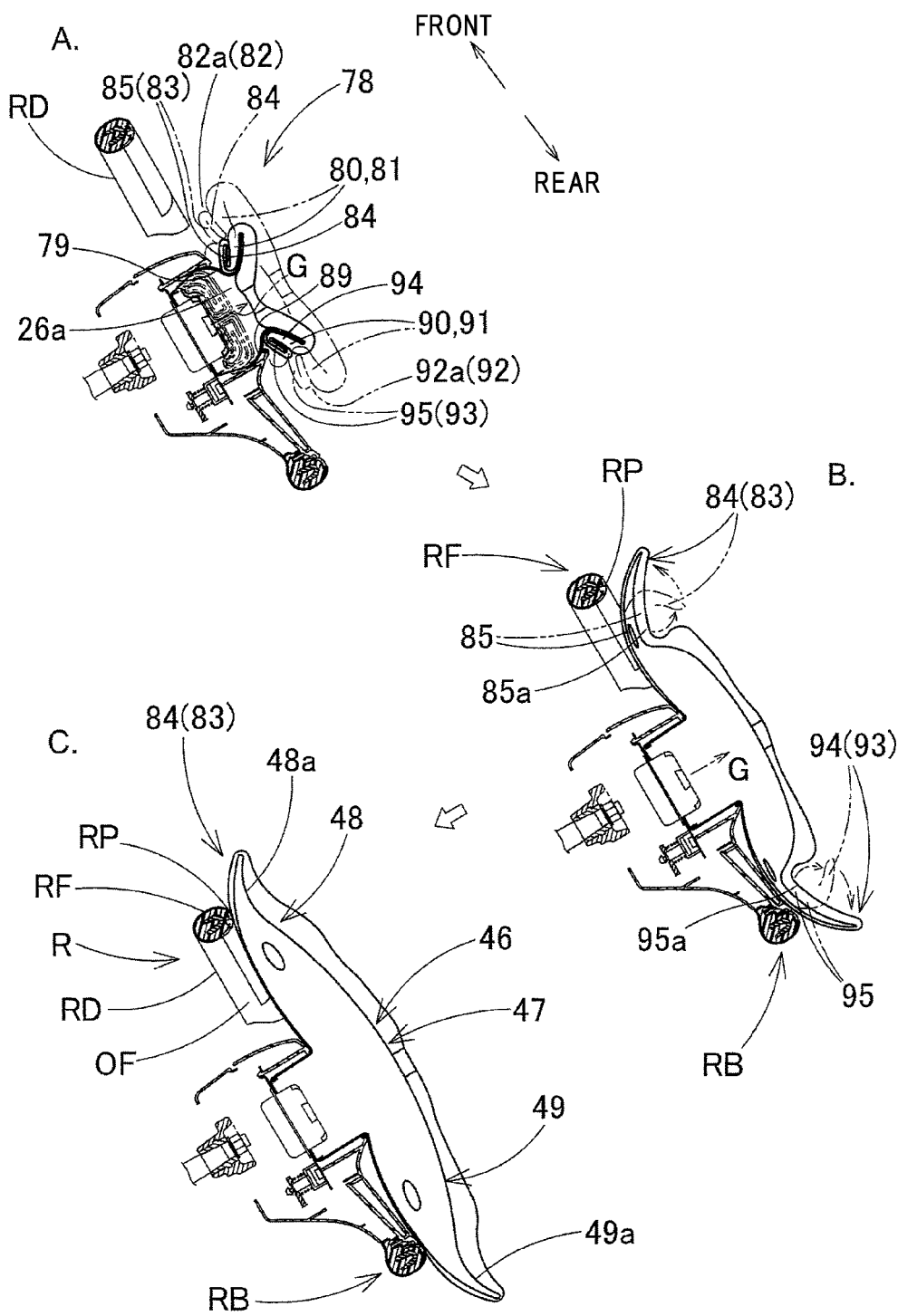
FIG. 16 is a view for sequentially describing an initial inflation state where an inflation gas flows into the completely folded body of the airbag of the embodiment.

At that time, in the embodiment, as illustrated in FIG. 15 and Section A of FIG. 16, when the inflation gas G flows inside through the inflow opening 43, prior to the tip 83 of the front overlapped portion 65 in the front-side folded portion 78, the mounting-portion-side folded portion 79 close to the mounting portion 44 of the front overlapped portion 65 begins to be inflated first, and then the central folded portion 80 between the tip 83 and the mounting-portion-side folded portion 79 is inflated. Since the mounting-portion-side folded portion 79 is inflated, the tip 83 is pushed forward and upward from the opening 82*a* of the dent portion 82. However, since the central folded portion 80 is inflated subsequently to the inflation of the mounting-portion-side folded portion 79, it is suppressed that the tip 83 protrudes to the upper side.

Thereafter, the mounting-portion-side folded portion 79 and the central folded portion 80 are inflated further so that the dent of the dent portion 82 is released, and the tip 83 is pushed to the upper side of the front portion RF of the ring portion R. At that time, since the leading edge 84 of the tip 83 are pressed by the central folded portion 80 inflating on the upper side, as illustrated in the two-dot chain line of Section A of FIG. 16 and the two-dot chain line of Section B of FIG. 16, the leading edge 84 is brought close to the front portion RF of the ring portion R in the state of being inverted on an upper surface 85*a* side of the tip root-side portion 85 to be directed rearward. When the mounting-portion-side folded portion 79 and the central folded portion 80 are inflated further, and the tip 83 is inflated, as illustrated in a solid line of Section B of FIG. 16 and in Section C of FIG. 16, the leading edge 84 rises forward from the upper surface 85*a* of the tip root-side portion 85 in a position where the upper surface (ring surface) RP of the front portion RF of the ring portion R is disposed, or a position where the vicinity of the inner side of the front portion RF of the ring portion R is disposed. The leading edge 84 is inflated to extend forward from the tip root-side portion 85 while the inverted folding is released.

Figure 17:
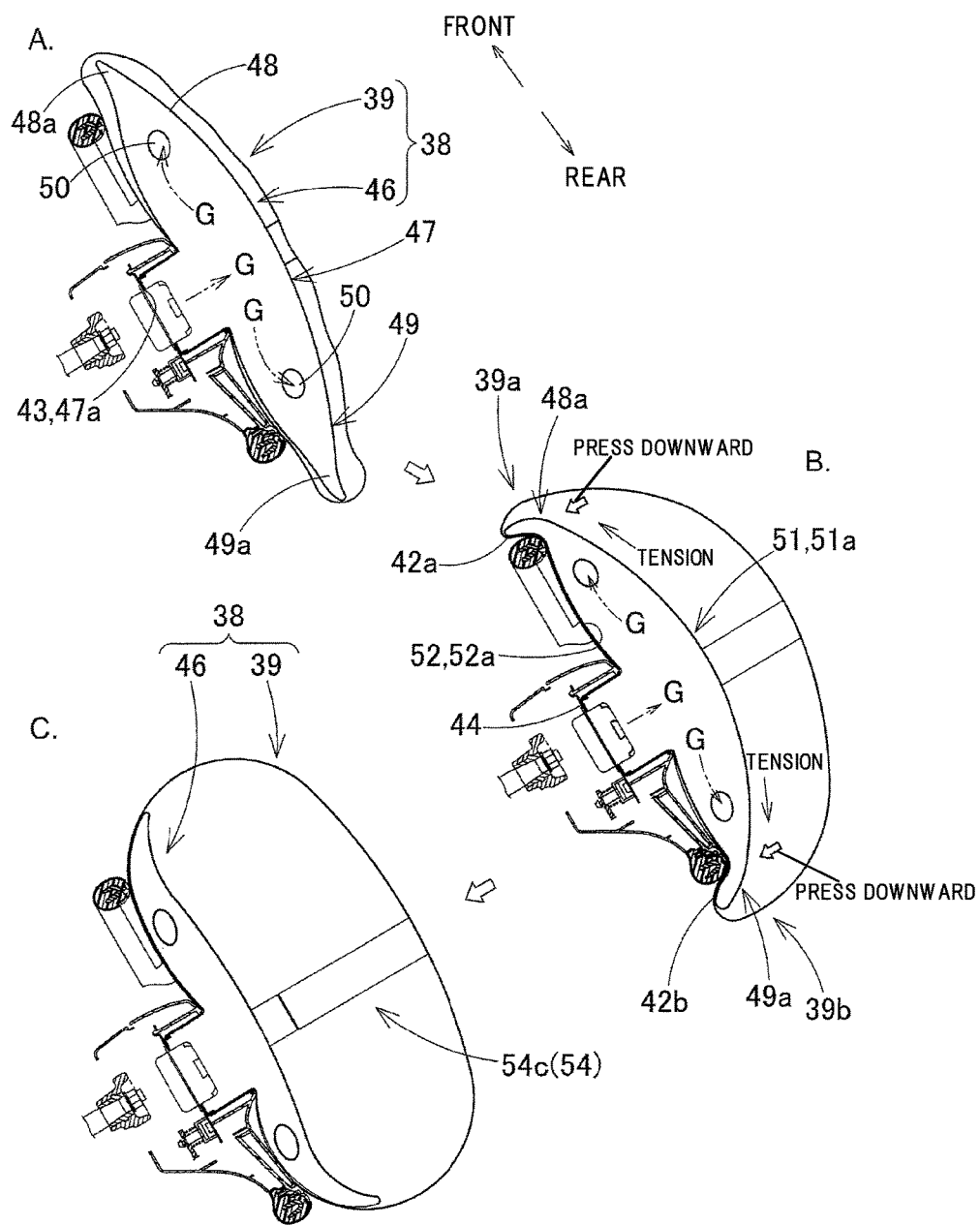
FIG. 17 is a view for sequentially describing states until the airbag of the embodiment is completely inflated after the airbag is being inflated.

The folding of the leading edge 84 is released to place the leading edge 84 on the upper surface RP side of the front portion RF of the ring portion R. Thus, the tip 83 of the front overlapped portion 65 does not go to a lower surface RD side of the front portion RF through an opening OF inside the front portion RF of the ring portion R, and is not separated largely from the upper surface RP of the front portion RF of the ring portion R while the tip 83 is brought close to the upper surface RP side of the front portion RF of the ring portion R to be deployed. Further, as illustrated in FIG. 17, the tip 83 is inflated such that the thickness increases. Thus, it can be suppressed that the airbag 38 floats from the front portion RF of the ring portion R in the middle of inflation. For this reason, in the airbag 38, a swinging movement of repeating the contact/separation of the ring portion R before the inflation of the airbag is completed can be suppressed, and thus a counterforce from the ring portion R can be quickly secured when the inflation of the airbag is completed.

Therefore, in the completely folded body 77 of the airbag 38 of the embodiment, it can be prevented that the inflating portion of the front-side folded portion 78 goes to the lower surface RD side of the ring portion R, or protrudes to be largely separated to the upper side of the ring portion R at the initial inflation.

Of course, in the completely folded body 77 of the airbag 38 of the embodiment the same behavior as above can be secured although the completely folded body 77 is covered with the airbag cover 25 including the left door 27 and the right door 28 which are open to both left and right sides. Even in the case of being applied to the airbag cover including the front door and the rear door which are open to both front and rear sides, the same behavior as above can be secured. Thus, the completely folded body 77 of the embodiment is not affected by where the door of the airbag cover pressed by the airbag is disposed, and preferably, it can be prevented that the inflating portion of the front-side folded portion 78 goes to the lower surface RD side of the ring portion R, or protrudes to be largely separated to the upper side of the ring portion R at the initial inflation.

In the completely folded body 77 of the embodiment, the longitudinally sectional shape in the horizontal center of the mounting portion 44 of the completely folded body 77 is formed such that the rear-side folded portion 88 is axisymmetric to the front-side folded portion 78 with a vertical line in the longitudinal center of the mounting portion 44 as the central reference line CL as illustrated in FIG. 14.

For this reason, at the initial inflation of the airbag 38, the rear-side folded portion 88 is also deployed similarly to the front-side folded portion 78 axisymmetrically in the longitudinal direction with the central reference line CL as a reference as illustrated in FIGS. 15 and 16.

That is, as illustrated in FIG. 15 and Section A of FIG. 16, when the inflation gas G flows inside through the inflow opening 43, prior to the tip 93 of the rear overlapped portion 68 in the rear-side folded portion 88, the mounting-portion-side folded portion 89 close to the mounting portion 44 of the rear overlapped portion 68 begins to be inflated first, and then the central folded portion 90 between the tip 93 and the mounting-portion-side folded portion 89 is inflated. Since the mounting-portion-side folded portion 89 is inflated, the tip 93 is pushed rearward and upward from the opening 92*a* of the dent portion 92. However, since the central folded portion 90 is inflated subsequently to the inflation of the mounting-portion-side folded portion 89, it is suppressed that the tip 93 protrudes to the upper side.

Thereafter, the mounting-portion-side folded portion 89 and the central folded portion 90 are further inflated so that the dent of the dent portion 92 is released, and the tip 93 is pushed to the upper side of the rear portion RB of the ring portion R. At that time, since the leading edge 94 of the tip 93 is pressed by the central folded portion 90 inflating on the upper side, as illustrated in the two-dot chain line of Section A of FIG. 16 and the two-dot chain line of Section B of FIG. 16, the leading edge 94 is brought close to the rear portion RB of the ring portion R in the state of being inverted on the upper surface 95a of the tip root-side portion 95 to be directed forward. When the mounting-portion-side folded portion 89 and the central folded portion 90 are further inflated, and the tip 93 is inflated, as illustrated in a solid line of Sections B and C of FIG. 16, the leading edge 94 rises rearward on the upper surface 95a of the tip root-side portion 95 in a position where the upper surface RP of the rear portion RB of the ring portion R is disposed. The leading edge 94 is inflated to extend rearward from the tip root-side portion 95 while the inverted folding is released.

The folding of the leading edge 94 is released to place the leading edge 94 on the upper surface RP side of the rear portion RB of the ring portion R. Even if an opening OB is provided inside the rear portion RB of the ring portion R illustrated in FIG. 23, that is, between a rear and left spoke portion SBL and a rear and right spoke portion SBR, the tip 93 of the rear overlapped portion 68 does not go to the lower surface RD side of the rear portion RB, and is not separated largely from the upper surface RP of the rear portion RB of the ring portion R while the tip 93 is brought close to the upper surface RP side of the rear portion RB of the ring portion R to be deployed. Further, as illustrated in FIG. 17, the tip 93 is inflated such that the thickness increases. Thus, it can be suppressed that the airbag 38 floats from the rear portion RB of the ring portion R in the middle of inflation.

Figure 23:
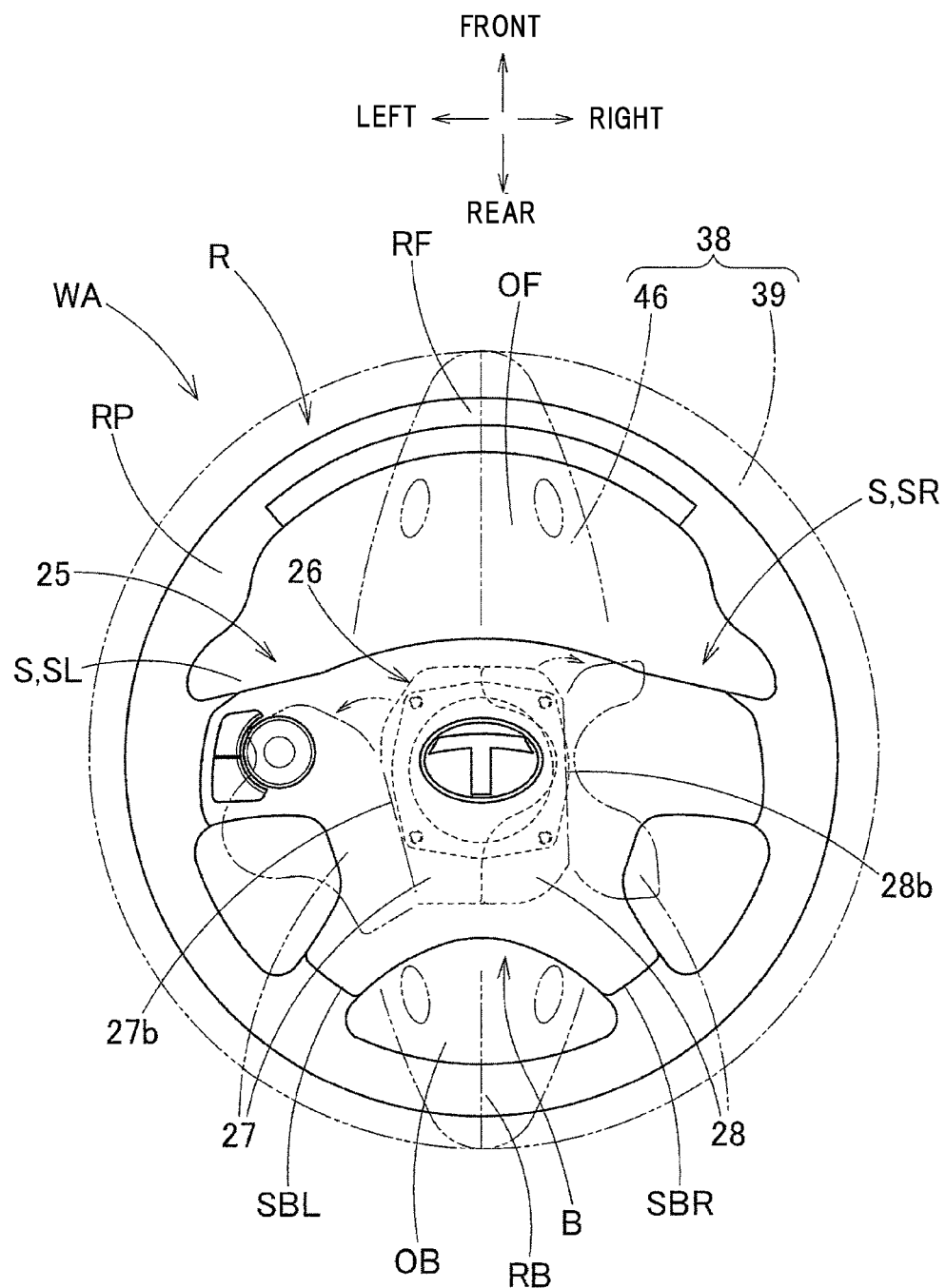
FIG. 23 is a plan view illustrating a modification of the steering wheel in which the completely folded body of the embodiment is mounted.

For this reason, when the above-described rear-side folded portion 88 is configured to be axisymmetric to the front-side folded portion 78 in the longitudinal direction, although the completely folded body 77 is mounted in the boss portion B of the steering wheel WA with four spokes which has an opening OB inside the rear portion RB of the ring portion R as illustrated in FIG. 23 or the steering wheel with two spokes, the rear-side folded portion 88 does not go into the opening OB on the rear portion RB side at the time of inflation, and it can be suppressed that the rear-side folded portion 88 protrudes to be largely separated to the upper side of the ring portion R. In the entire airbag 38, the swinging movement of repeating the contact/separation of the ring portion R before the inflation of the airbag is completed can be suppressed, and the counterforce from the ring portion R can be quickly secured when the inflation of the airbag is completed.

As described above, at the time of the initial inflation of the airbag 38, the airbag 38 is placed on the upper surface RP side of the ring portion R, the airbag 38 is deployed to be brought to the upper surface RP side of the ring portion R while not being separated largely from the upper surface RP of the ring portion R, and the state of being inflated to increase thickness is secured. In other words, the float of the airbag 38 from the ring portion R in the middle of inflation is suppressed so that the swinging movement of repeating the contact/separation of the ring portion R can be suppressed before the inflation of the airbag 38 is completed, and the counterforce from the ring portion R can be quickly secured when the inflation of the airbag is completed. When paying attention to the above point, at least the rear-side folded portion 88 of the front-side folded portion 78 and the rear-side folded portion 88 may be configured as above so that the behavior can be secured aggressively on the rear portion RB side of the ring portion R.

That is, at least the rear-side folded portion 88 of the front-side folded portion 78 and the rear-side folded portion 88 in the completely folded body 77 of the airbag 38 has such a folded shape that the tip 94 separate longitudinally from the mounting portion 44 of the rear overlapped portion 68 is provided between the mounting-portion-side folded portion 89 near the mounting portion 44 and the central folded portion 90 between the tip 94 and the mounting-portion-side folded portion 89, and is stored in the dent portion 92 in which the rear side is open and the front side is dented. The tip 93 of the rear overlapped portion 68 includes the leading edge 94 separate longitudinally the farthest from the mounting portion 44, and the tip root-side portion 95 connected to the leading edge 94. The leading edge 94 may be configured to be provided on the upper side of the tip root-side portion 95 in the rear-side folded portion 88 to be inverted forward to the center CO side of the mounting portion 44.

In this case, for example, as described in JP-A-2012-6598 exemplified in the related art, the front-side folded portion may be folded twice such that the front overlapped portion is folded to the mounting portion side in the central position from the mounting portion to the separate front end side, and the tip side of the folded crease is folded to the mounting portion side, that is, the front-side folded portion may be formed by being folded twice. Of course, the front-side folded portion may be formed as the front-side folded portion 78 of the embodiment.

In the completely folded body 77 of the embodiment, the airbag 38 includes the outer bag 39 including the driver-side wall 40 and the vehicle-side wall 42, and the inner bag 46 provided in the circumferential periphery of the inflow opening 43 of the vehicle-side wall 42 in the outer bag 39. The inner bag 46 includes the central portion 47 covering the inflow opening 43, and the front-side arm 48 and the rear-side arm 49 which extend from the central portion 47 to both front and rear sides. In the central portion 47, the communication opening 47a communicating with the inflow opening 43 is provided, and together with the mounting portion 44, the inner-bag-side mounting portion 47b mounted on the boss portion B side is provided in the circumferential periphery of the communication opening 47a through the mounting base 16. The front-side arm 48 and the rear-side arm 49 have the outflow opening 50 through which the inflation gas G flowing through the communication opening 47a flows out into the outer bag 39. At the inflation of the inner bag 46, the tips 48a and 49a are configured to press downward the inner circumferential surface of the outer bag 39.

With a specific configuration, in the inner bag 46, the longitudinal length dimensions of the upper side and the lower side which are obtained by coupling the tips 48a and 49a of the front-side arm 48 and the rear-side arm 49 are set such that the longitudinal upper-side length dimension LU of the upper-side outer circumferential wall 51 passing by the central portion 47 is larger than the longitudinal lower-side length dimension LD of the lower-side outer circumferential wall 52 passing by the mounting portion 44.

For this reason, in the above-configured inner bag 46, when the inflation gas G flows into the outer bag 39, the central portion 47 admits the inflation gas G to flow thereinto through the communication opening 47a so as to be inflated, and the front-side arm 48 and the rear-side arm 49 are also inflated when the inflation gas G flows out through the outflow opening 50 into the outer bag 39.

As illustrated in Sections A and B of FIG. 17, when the inner bag 46 is completely inflated, the longitudinal upper-side length dimension LU of the upper-side outer circumferential wall 51 passing by the central portion 47 of the inner bag 46 is larger than the longitudinal lower-side length dimension LD of the lower-side outer circumferential wall 52 passing by the mounting portion 44. Thus, the upper-side outer circumferential wall 51 is easily inflated freely compared to the lower-side outer circumferential wall 52, and the lower-side outer circumferential wall 52 has the mounting portion 44 so as to be hardly inflated freely. As a result, the upper-side outer circumferential wall 51 exerts a tension that presses downward the tips 48a and 49a of the front-side arm 48 and the rear-side arm 49. The front-side arm 48 and the rear-side arm 49 press downward the inner circumferential surface of the outer bag 39 on the respective tips 48a and 49a. It is smoothly suppressed that the outer bag 39 floats from the front portion RF or the rear portion RB of the ring portion R.

For this reason, in the embodiment, the inner bag 46 that can suppress that the vicinity of both front and rear ends 39a and 39b of the outer bag 39 floats from the ring portion R in the middle of inflation the airbag 38 is provided in the outer bag 39 including the driver-side wall 40 and the vehicle-side wall 42 configuring the outer circumferential wall of the airbag 38. For this reason, since the front-side arm 48 and the rear-side arm 49 of the inner bag 46 are inflated before the completion of inflation, as illustrated in Section A of FIG. 3 and Section B of FIG. 17 at the time of releasing the folding, the front-side folded portion 78 and the rear-side folded portion 88 of the airbag 38 do not float from the front portion RF and the rear portion RB of the ring portion R and can maintain a close state, and the swinging movement of repeating the contact/separation of the ring portion R can be suppressed. Thereafter, as illustrated in Section B of FIG. 3 and Section C of FIG. 17, the counterforce from the ring portion R can be secured further quickly when the inflation is completed.

Without regard to such a point, the airbag 38 may be configured only by the outer bag 39 without using the inner bag 46.

In the folding method of the completely folded body 77 of the airbag 38 of the embodiment, the mounting-portion-side folded portion 79, the central folded portion 80, and the tip 83 from the mounting portion 44 in the front-side folded portion 78 before folding are flatly deployed. That is, the front portion 74 of the horizontally-shortened body 71 is in the state of being flatly deployed as illustrated in Section D of FIG. 8. From the state, the front portion 74 is folded through the nipping process illustrated in Section A of FIG. 9, the rotating process illustrated in Sections B and C of FIG. 9, and Sections A and B of FIG. 10, and the folding process illustrated in Section C of FIG. 10 and Section A of FIG. 11 before folding.

That is, first, in the nipping process, as illustrated in Section A of FIG. 9, the upper-side contact portion 81 is nipped from the both sides (vertically) by the pressing plates P4 and P5. As illustrated in Sections B and C of FIG. 9, and Sections A and B of FIG. 10, in the rotating process, the front periphery 81a of the nipped upper-side contact portion 81 is rotated to the vehicle-side wall 42 side to be vertically inverted, and the nipped upper-side contact portion 81 is disposed on the front side of the upper side of the mounting portion 44. In the folding process, as illustrated in Section C of FIG. 10 and Section A of FIG. 11, the front-side folded portion 78 is folded in such a manner that the leading edge 84 is folded by attaching the crease 86 between the leading edge 84 and the tip root-side portion 85, and is inserted to the lower position of the upper-side contact portion 81.

In the folding method of the embodiment, the front-side folded portion 78 before folding is in a state where an area from the mounting portion 44 to the leading edge 84 of the tip 83 is flatly deployed. That is, through the horizontally-shortening folding process, the initial deployed body 64 is folded to have such a horizontal width dimension WX that can be stored in the storage portion (a portion between the mounting base 16 and the airbag cover 25), and the front portion 74 forming the horizontally-shortened body 71 is flatly deployed. From the state, simply, the upper-side contact portion 81 is nipped and rotated to be disposed on the upper and front side of the mounting portion 44, and the leading edge 84 of the tip 83 is folded to be inverted. Thus, the front-side folded portion 78 can be simply formed in which it can be suppressed that the front-side folded portion goes to the lower surface RD side of the ring portion R or protrudes to the upper side of the ring portion R to be largely separated at the initial inflation.

Figure 18:
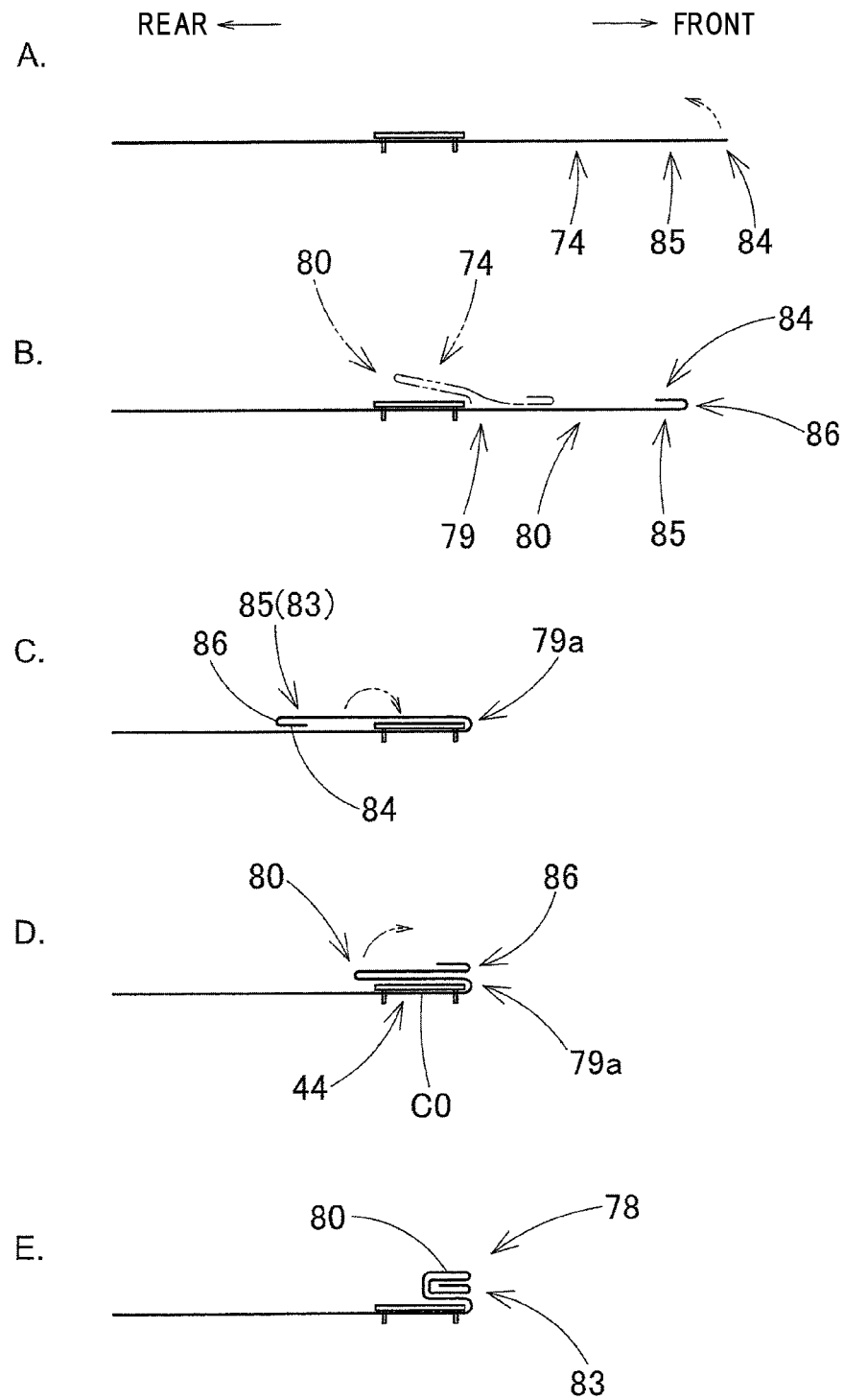
FIG. 18 is a view for describing a process of forming a front-side folded portion in a longitudinally-shortening folding process in a folding method of a modification of the completely folded body of the airbag of the embodiment.

Of course, the folding method of folding the completely folded body 77 of the embodiment is not limited to the folding method of the embodiment. For example, as illustrated in Sections A and B of FIG. 18, in the state of the flat front portion 74, the leading edge 84 is folded to be overlapped with the tip root-side portion 85 by attaching the crease 86. As illustrated in Sections B and C of FIG. 18, the front portion 74 is folded rearward, and as illustrated in Sections C and D of FIG. 18, the front portion is folded such that the crease 86 is positioned on the upper side of the vicinity of the crease 79a on the front side. As illustrated in Sections D and E of FIG. 18, a portion where the mounting-portion-side folded portion 79 and the central folded portion 80 extend rearward from the center CO of the mounting portion 44 is folded forward, and the central folded portion 80 is overlapped on the tip 83, thereby forming the front-side folded portion 78. Otherwise, as illustrated in the two-dot chain line of Section B of FIG. 18, in a state where the leading edge 84 is overlapped on the tip root-side portion 85, the central folded portion 80 may be pulled rearward such that the crease 86 is positioned on the upper side of the vicinity of the crease 79a, and then may be folded as illustrated in Sections D and E of FIG. 18. As above, as the folding method of the front-side folded portion 78 and the rear-side folded portion 88, various methods may be adopted in addition to the embodiment.

Figure 20:
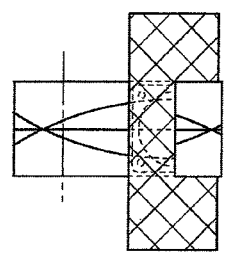
FIG. 20 is a view for describing a process of forming the rear-side folded portion in the longitudinally-shortening folding process in the folding method of the modification of the completely folded body of the airbag of the embodiment, and illustrates a process after FIG. 18.
Figure 20:

In the completely folded body 77 of the embodiment, the rear-side folded portion 88 is folded to be axisymmetric to the front-side folded portion 78 in the longitudinal direction. However, when the steering wheel is three-spoke type having the left-side spoke portion SL, the right-side spoke portion SR, and the back spoke portion SB extending rearward from the boss portion B similarly to the steering wheel W of the embodiment, the opening OB which is inside the rear portion RB of the ring portion R similarly to the steering wheel WA of four-spoke type in FIG. 23 is not disposed on the rear portion RB side of the ring portion R. For this reason, similarly to the rear-side folded portion 88A of the completely folded body 77A illustrated in Section D of FIG. 20 and FIG. 21, the completely folded body may be folded such that the rear-side folded portion is roll-folded to be wound to the vehicle-side wall 42 side so as to avoid the float from the rear portion RB of the ring portion R.

Figure 19:
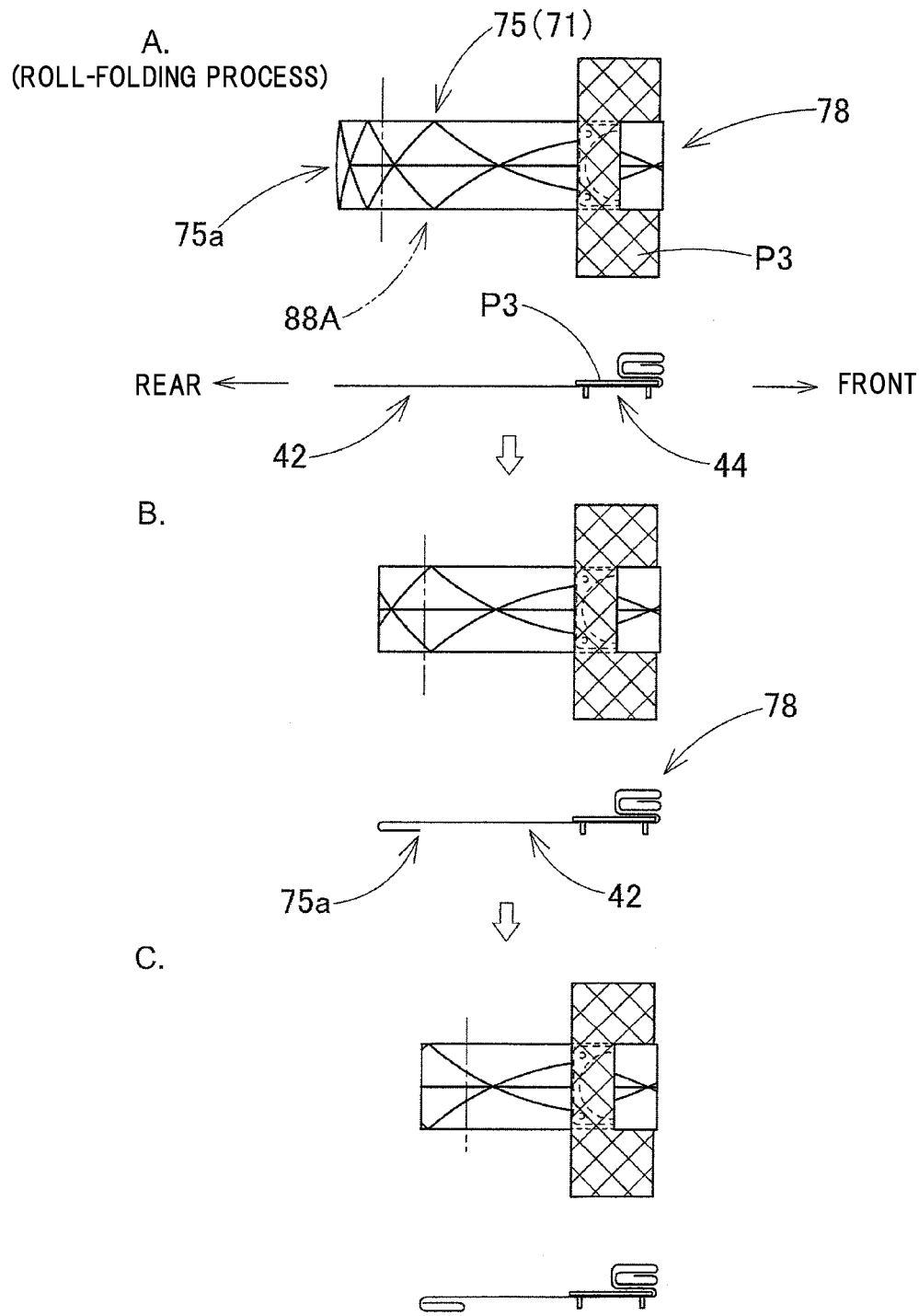
FIG. 19 is a view for describing a process of forming a rear-side folded portion in the longitudinally-shortening folding process in the folding method of the modification of the completely folded body of the airbag of the embodiment.

In the completely folded body 77A, the front-side folded portion 78 is the same as the front-side folded portion 78 of the completely folded body 77. However, as illustrated in FIG. 19 and Sections A and B of FIG. 20, the tip 75a of the rear portion 75 of the horizontally-shortened body 71 is roll-folded to be wound to the vehicle-side wall 42 side, and as illustrated in Sections B, C and D of FIG. 20, a roll-folded portion 97 is placed on the mounting portion 44, thereby forming the rear-side folded portion 88A.

Figure 21:
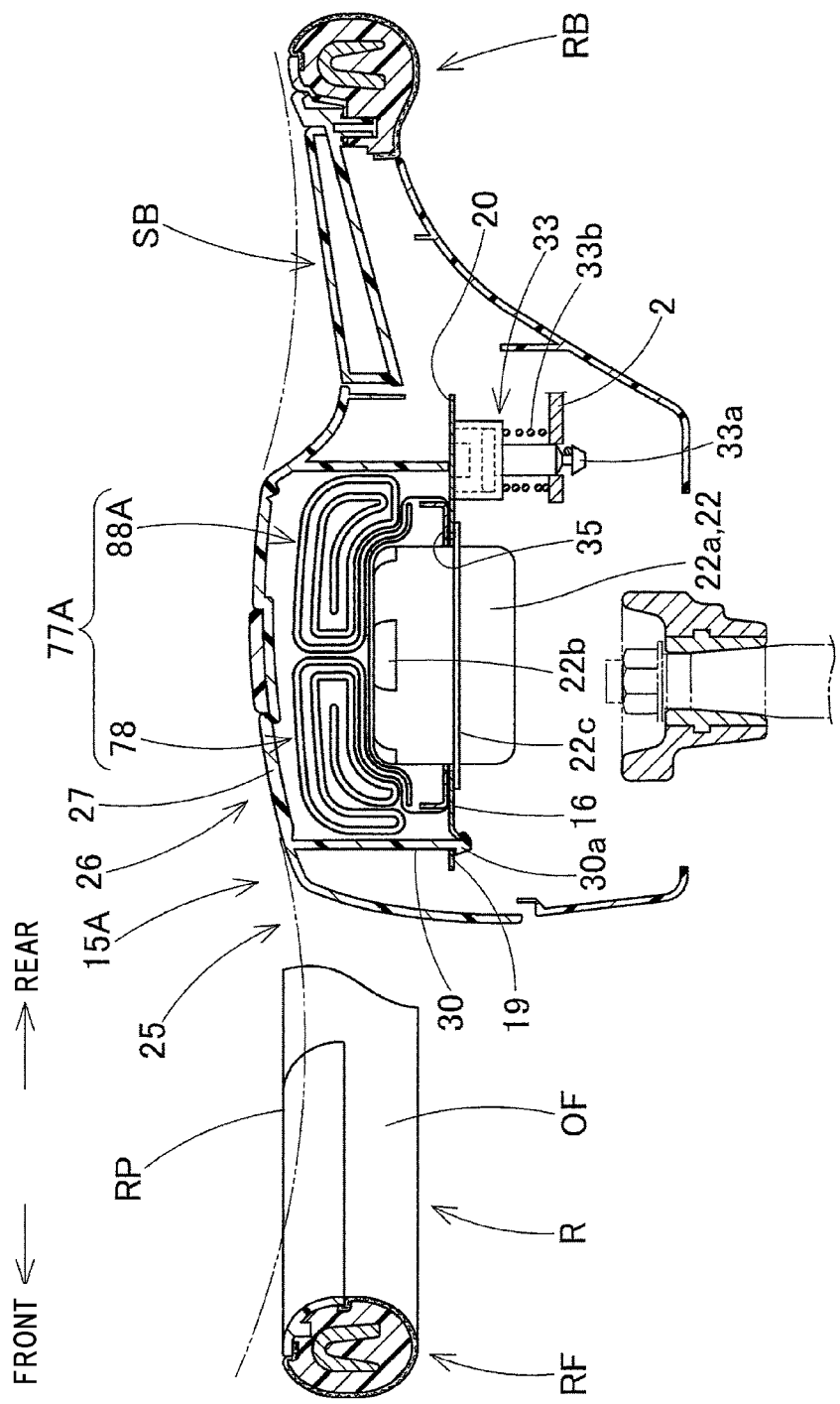
FIG. 21 is a sectional view schematically illustrating a state where an airbag device provided with the completely folded body of the modification is mounted in the steering wheel.
Figure 22:
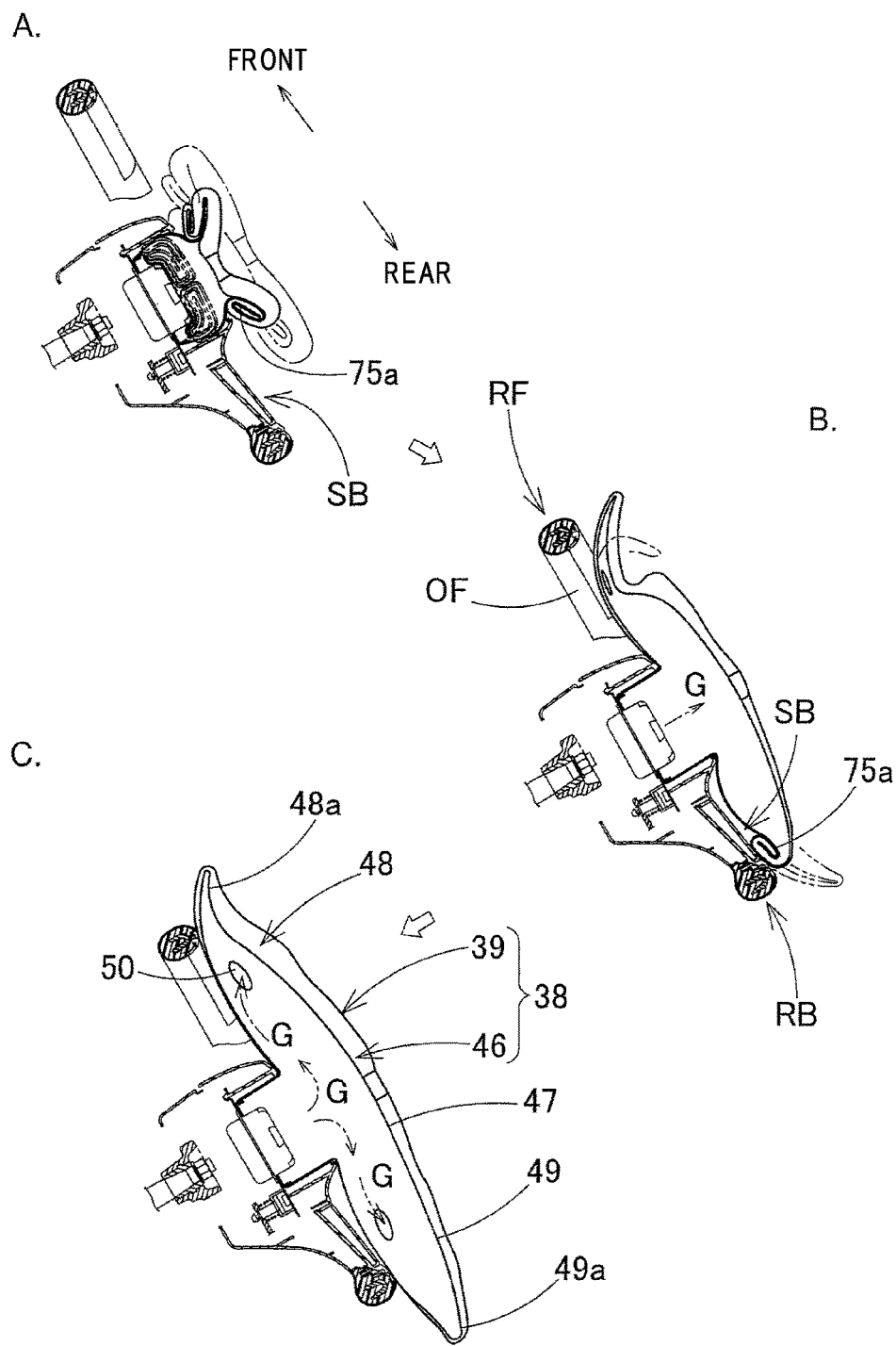
FIG. 22 is a view for sequentially describing an initial inflation state where the inflation gas flows into the completely folded body of the modification.

Similarly to the completely folded body 77, as illustrated in FIG. 21, the completely folded body 77A is mounted in the steering wheel W. At the time of the initial inflation of the airbag 38 according to the operation of an airbag device 15A, as illustrated in FIG. 22, the front-side folded portion 78 is deployed similarly to the completely folded body 77 illustrated in FIG. 16. However, with the release of the roll-folding, the rear-side folded portion 88A is deployed to maintain a state where the tip 75a contacts the back spoke portion SB, and is deployed without the float from the upper surface RP of the rear portion RB of the ring portion R. For this reason, if the opening OB is not on the rear portion RB side of the ring portion R of FIG. 23, and the steering wheel W is provided with the back spoke portion SB (see FIG. 1), the rear-side folded portion 88 of the completely folded body 77 may be roll-folded to prevent the float from the upper surface RP of the rear portion RB of the ring portion R similarly to the rear-side folded portion 88A. As described in JP-A-2012-6598 exemplified in the related art and the like, the rear-side folded portion may be folded twice such that the rear overlapped portion is folded to the mounting portion side in the central position from the mounting portion to the separate rear end side, and the tip side of the folded crease is folded to the mounting portion, that is, the rear-side folded portion may be formed by being folded twice.

What is claimed is:

1. A folding method of a completely folded body of an airbag which is stored in a boss portion of a steering wheel and is completely inflated to be supported by an upper surface of a ring portion of the steering wheel steered by a driver, the airbag being formed by coupling outer circumferential peripheries of a driver-side wall and a vehicle-side wall supported by the ring portion which have substantially circular shape to each other, the vehicle-side wall being provided, in a center, with an inflow opening which is open to admit an inflation gas to flow inside, and a mounting portion which is disposed in a circumferential periphery of the inflow opening and is used to mount the airbag in the boss portion, the completely folded body being configured such that a front-side folded portion and a rear-side folded portion are disposed on front and rear sides of an upper side of the mounting portion, the front-side folded portion and the rear-side folded portion being formed respectively from a front overlapped portion and a rear overlapped portion which are centered on the mounting portion in a state where the driver-side wall and the vehicle-side wall are overlapped to be flatly deployed, at least the front-side folded portion of the front-side folded portion and the rear-side folded portion having such a folded shape that a tip separated longitudinally from the mounting portion of the front overlapped portion is stored in a dent portion, in which a front side is open and a rear side is dented, between a mounting-portion-side folded portion near the mounting portion and a central folded portion between the tip and the mounting-portion-side folded portion, the tip of the front overlapped portion including a leading edge separated longitudinally, farthest from the mounting portion, and a tip root-side portion connected to the leading edge, the leading edge being provided on an upper side of the tip root-side portion in the front-side folded portion to be inverted rearward to a central side of the mounting portion, the central folded portion in the front-side folded portion being connected to the tip root-side portion, and includes an upper-side contact portion which contacts with the leading edge at an upper side of the tip and is formed from the front overlapped portion, the method comprising:

nipping both sides of the upper-side contact portion when the mounting-portion-side folded portion, the central folded portion, and the tip are folded from a state of being flatly deployed from the mounting portion in the front-side folded portion;

rotating a front periphery of the nipped upper-side contact portion to a vehicle-side wall side to be vertically inverted, and disposing the nipped upper-side contact portion on the front side of the upper side of the mounting portion; and then folding the leading edge by attaching a crease between the leading edge and the tip root-side portion and inserting the leading edge to a lower position of the upper-side contact portion.

* * * * *